US009944245B2

(12) United States Patent
Moeller et al.

(10) Patent No.: US 9,944,245 B2
(45) Date of Patent: Apr. 17, 2018

(54) EXTENDING PASS-THROUGH AIRBAG OCCUPANT RESTRAINT SYSTEMS, AND ASSOCIATED SYSTEMS AND METHODS

(71) Applicant: AmSafe, Inc., Phoenix, AZ (US)

(72) Inventors: Trenton Dirk Moeller, Mesa, AZ (US); Louis Gregory Vargas, Litchfield, AZ (US); Todd Joseph Humbert, Chandler, AZ (US); David T. Merrill, Scottsdale, AZ (US)

(73) Assignee: AmSafe, Inc., Phoenix, AZ (US)

( * ) Notice: Subject to any disclaimer, the term of this patent is extended or adjusted under 35 U.S.C. 154(b) by 0 days.

(21) Appl. No.: 15/079,984

(22) Filed: Mar. 24, 2016

(65) Prior Publication Data

US 2016/0280171 A1    Sep. 29, 2016

Related U.S. Application Data

(60) Provisional application No. 62/139,684, filed on Mar. 28, 2015.

(51) Int. Cl.
*B60R 21/18* (2006.01)
*B60R 22/12* (2006.01)
(Continued)

(52) U.S. Cl.
CPC ............. *B60R 21/18* (2013.01); *B60R 22/12* (2013.01); *B64D 11/06205* (2014.12); *B60R 2021/0093* (2013.01); *B64D 2201/00* (2013.01)

(58) Field of Classification Search
CPC ............ B60R 21/18; B60R 2021/0093; B64D 11/062; B64D 11/06205; B64D 2201/00
(Continued)

(56) References Cited

U.S. PATENT DOCUMENTS 2,502,206 A    3/1950 Creek
3,430,979 A    3/1969 Terry et al.
(Continued)

FOREIGN PATENT DOCUMENTS

CN    1351710 A    5/2002
CN    1750966 A    3/2006
(Continued)

OTHER PUBLICATIONS

European Search Report and Opinion dated Aug. 15, 2016; European Patent Application No. 16162676; 5 pages.
(Continued)

*Primary Examiner* — Keith J Frisby
(74) *Attorney, Agent, or Firm* — Perkins Coie LLP

(57) ABSTRACT

Vehicle occupant restraint systems that include a compact, web-mounted airbag that can be deployed during a crash event are described herein. In some embodiments, the web (e.g., a shoulder belt) passes through the stowed airbag during normal use and, when the airbag inflates and deploys, the airbag extends along the length of the web (for example, along the entire length, or at least most of the length, of the web) to protect the occupant. In some embodiments, the restraint systems include shoulder belts having first and second overlapping web portions, and when the airbag inflates and deploys, the airbag extends along the length of the first web portion between the first web portion and the second web portion.

16 Claims, 20 Drawing Sheets

US 9,944,245 B2

Page 2

(51) Int. Cl.
    B64D 11/06    (2006.01)
    B60R 21/00    (2006.01)

(58) Field of Classification Search
    USPC ....................................................... 280/733
    See application file for complete search history.

(56) References Cited

U.S. PATENT DOCUMENTS

| | | |
|---|---|---|
| 3,560,027 A | 2/1971 | Graham |
| 3,586,347 A | 6/1971 | Carey et al. |
| 3,603,535 A | 9/1971 | DePolo |
| 3,682,498 A | 8/1972 | Rutzki |
| 3,706,463 A | 12/1972 | Lipkin |
| 3,730,583 A | 5/1973 | Colovas et al. |
| 3,756,620 A | 9/1973 | Radke |
| 3,766,612 A | 10/1973 | Hattori |
| 3,801,156 A | 4/1974 | Granig |
| 3,820,842 A | 6/1974 | Stephenson |
| 3,841,654 A | 10/1974 | Lewis |
| 3,865,398 A | 2/1975 | Woll |
| 3,866,940 A | 2/1975 | Lewis |
| 3,888,503 A | 6/1975 | Hamilton |
| 3,888,505 A | 6/1975 | Shibamoto |
| 3,897,081 A | 7/1975 | Lewis |
| 3,905,615 A | 9/1975 | Schulman |
| 3,933,370 A | 1/1976 | Abe et al. |
| 3,948,541 A | 4/1976 | Schulman |
| 3,970,329 A | 7/1976 | Lewis |
| 3,971,569 A | 7/1976 | Abe et al. |
| 4,107,604 A | 8/1978 | Bernier |
| 4,261,535 A | 4/1981 | Swanson |
| 4,437,628 A | 3/1984 | Schwartz |
| 4,536,008 A | 8/1985 | Brown |
| 4,565,535 A | 1/1986 | Tassy |
| 4,611,491 A | 9/1986 | Brown et al. |
| 4,657,516 A | 4/1987 | Tassy |
| 4,722,573 A | 2/1988 | Komohara |
| 4,765,569 A | 8/1988 | Higgins |
| 4,842,299 A | 6/1989 | Okamura et al. |
| 4,971,354 A | 11/1990 | Kim |
| 4,987,783 A | 1/1991 | D'Antonio et al. |
| 4,995,638 A | 2/1991 | Shinto et al. |
| 4,995,640 A | 2/1991 | Saito |
| 5,026,305 A | 6/1991 | Del Guidice et al. |
| 5,062,662 A | 11/1991 | Cameron |
| 5,062,663 A | 11/1991 | Satoh |
| 5,161,821 A | 11/1992 | Curtis |
| 5,162,006 A | 11/1992 | Yandle, II |
| 5,183,288 A | 2/1993 | Inada et al. |
| 5,184,844 A | 2/1993 | Goor |
| 5,194,755 A | 3/1993 | Rhee et al. |
| 5,199,739 A | 4/1993 | Fujiwara et al. |
| 5,246,250 A | 9/1993 | Wolanin et al. |
| 5,280,953 A | 1/1994 | Wolanin et al. |
| 5,288,104 A | 2/1994 | Chen |
| 5,299,827 A | 4/1994 | Igawa |
| 5,301,902 A | 4/1994 | Kalberer et al. |
| 5,324,071 A | 6/1994 | Gotomyo |
| 5,335,937 A | 8/1994 | Uphues et al. |
| 5,335,939 A | 8/1994 | Kuriyama et al. |
| 5,344,210 A | 9/1994 | Marwan et al. |
| 5,375,875 A | 12/1994 | DiSalvo et al. |
| 5,400,867 A | 3/1995 | Muller et al. |
| 5,411,289 A | 5/1995 | Smith et al. |
| 5,447,327 A | 9/1995 | Jarboe et al. |
| 5,454,595 A | 10/1995 | Olson et al. |
| 5,456,491 A | 10/1995 | Chen et al. |
| 5,465,999 A | 11/1995 | Tanaka et al. |
| 5,470,103 A | 11/1995 | Vaillancourt et al. |
| 5,472,231 A | 12/1995 | France |
| 5,473,111 A | 12/1995 | Hattori et al. |
| 5,482,230 A | 1/1996 | Bird et al. |
| 5,485,041 A | 1/1996 | Meister |
| 5,492,360 A | 2/1996 | Logeman |
| 5,492,361 A | 2/1996 | Kim |
| 5,496,059 A | 3/1996 | Bauer |
| 5,499,840 A | 3/1996 | Nakano |
| 5,556,056 A | 9/1996 | Kalberer et al. |
| 5,558,300 A | 9/1996 | Kalberer et al. |
| 5,564,734 A | 10/1996 | Stuckle |
| 5,597,178 A | 1/1997 | Hardin, Jr. |
| 5,609,363 A | 3/1997 | Finelli |
| 5,630,616 A | 5/1997 | McPherson |
| 5,672,916 A | 9/1997 | Mattes et al. |
| 5,695,242 A | 12/1997 | Brantman et al. |
| 5,727,270 A | 3/1998 | Cope et al. |
| 5,734,318 A | 3/1998 | Nitschke et al. |
| 5,738,368 A | 4/1998 | Hammond et al. |
| 5,752,714 A | 5/1998 | Pripps et al. |
| 5,758,900 A | 6/1998 | Knoll et al. |
| 5,765,869 A | 6/1998 | Huber |
| 5,772,238 A | 6/1998 | Breed et al. |
| 5,802,479 A | 9/1998 | Kithil et al. |
| 5,803,489 A | 9/1998 | Nusshor |
| 5,839,753 A | 11/1998 | Yaniv et al. |
| 5,851,055 A | 12/1998 | Lewis |
| 5,863,065 A | 1/1999 | Boydston et al. |
| 5,868,421 A | 2/1999 | Eyrainer |
| 5,871,230 A | 2/1999 | Lewis |
| 5,871,231 A | 2/1999 | Richards et al. |
| 5,886,373 A | 3/1999 | Hosogi |
| 5,906,391 A | 5/1999 | Weir et al. |
| 5,911,434 A | 6/1999 | Townsend |
| 5,921,507 A | 7/1999 | Kalberer et al. |
| 5,924,726 A | 7/1999 | Pan |
| 5,927,748 A | 7/1999 | O'Driscoll |
| 5,927,754 A | 7/1999 | Patzelt et al. |
| 5,947,513 A | 9/1999 | Lehto |
| 5,975,565 A | 11/1999 | Cuevas |
| 5,984,350 A | 11/1999 | Hagan et al. |
| 5,988,438 A | 11/1999 | Lewis et al. |
| RE36,587 E | 2/2000 | Tanaka et al. |
| 6,019,388 A | 2/2000 | Okazaki et al. |
| 6,042,139 A | 3/2000 | Knox |
| RE36,861 E | 4/2000 | Tanaka et al. |
| 6,059,311 A | 5/2000 | Wipasuramonton et al. |
| 6,059,312 A | 5/2000 | Staub et al. |
| 6,065,772 A | 5/2000 | Yamamoto et al. |
| 6,082,763 A | 7/2000 | Kokeguchi |
| 6,113,132 A | 9/2000 | Saslecov |
| 6,126,194 A | 10/2000 | Yaniv et al. |
| 6,135,489 A | 10/2000 | Bowers |
| 6,142,508 A | 11/2000 | Lewis |
| 6,142,511 A | 11/2000 | Lewis |
| 6,149,231 A | 11/2000 | Wustholz |
| 6,155,595 A | 12/2000 | Schultz |
| 6,155,598 A | 12/2000 | Kutchey |
| 6,158,765 A | 12/2000 | Sinnhuber |
| 6,168,195 B1 | 1/2001 | Okazaki et al. |
| 6,173,988 B1 | 1/2001 | Igawa |
| 6,193,269 B1 | 2/2001 | Amamori |
| 6,199,900 B1 | 3/2001 | Zeigler et al. |
| 6,206,411 B1 | 3/2001 | Sunabashiri |
| 6,217,059 B1 | 4/2001 | Brown et al. |
| 6,224,097 B1 | 5/2001 | Lewis |
| 6,254,121 B1 | 7/2001 | Fowler et al. |
| 6,254,130 B1 | 7/2001 | Jayaraman et al. |
| 6,260,572 B1 | 7/2001 | Wu |
| 6,260,877 B1 | 7/2001 | Rasmussen et al. |
| 6,276,714 B1 | 8/2001 | Yoshioka |
| 6,293,582 B1 | 9/2001 | Lewis |
| 6,325,412 B1 | 12/2001 | Pan |
| 6,336,657 B1 | 1/2002 | Akaba et al. |
| 6,378,896 B1 | 4/2002 | Sakakida et al. |
| 6,378,898 B1 | 4/2002 | Lewis et al. |
| 6,382,666 B1 | 5/2002 | Devonport |
| 6,390,502 B1 | 5/2002 | Ryan et al. |
| 6,398,254 B2 | 6/2002 | David et al. |
| 6,406,058 B1 | 6/2002 | Devonport et al. |
| 6,419,263 B1 | 7/2002 | Büsgen et al. |
| 6,422,512 B1 | 7/2002 | Lewis et al. |
| 6,425,601 B1 | 7/2002 | Lewis et al. |
| 6,439,600 B1 | 8/2002 | Adkisson |
| 6,442,807 B1 | 9/2002 | Adkisson |

(56) References Cited

U.S. PATENT DOCUMENTS

| | | |
|---|---|---|
| 6,443,496 B2 | 9/2002 | Campau et al. |
| 6,460,878 B2 | 10/2002 | Eckert et al. |
| 6,547,273 B2 | 4/2003 | Grace et al. |
| 6,557,887 B2 | 5/2003 | Wohllebe |
| 6,585,289 B1 | 7/2003 | Hammer et al. |
| 6,607,210 B2 | 8/2003 | Eckert et al. |
| 6,616,177 B2 | 9/2003 | Thomas et al. |
| 6,619,689 B2 | 9/2003 | Spencer et al. |
| 6,648,367 B2 | 11/2003 | Breed et al. |
| 6,669,229 B2 | 12/2003 | Thomas et al. |
| 6,682,141 B2 | 1/2004 | Coughren et al. |
| 6,688,642 B2 | 2/2004 | Sollars, Jr. |
| 6,705,641 B2 | 3/2004 | Schneider et al. |
| 6,715,788 B2 | 4/2004 | Saiguchi et al. |
| 6,729,643 B1 | 5/2004 | Bassick et al. |
| 6,739,264 B1 | 5/2004 | Hosey et al. |
| 6,746,074 B1 | 6/2004 | Kempf et al. |
| 6,749,220 B1 | 6/2004 | Wipasuramonton et al. |
| 6,758,489 B2 | 7/2004 | Xu |
| 6,764,097 B2 | 7/2004 | Kelley et al. |
| 6,769,714 B2 | 8/2004 | Hosey et al. |
| 6,773,030 B2 | 8/2004 | Fischer et al. |
| 6,776,434 B2 | 8/2004 | Ford et al. |
| 6,779,813 B2 | 8/2004 | Lincoln |
| 6,789,818 B2 | 9/2004 | Gioutsos et al. |
| 6,789,819 B1 | 9/2004 | Husby |
| 6,789,821 B2 | 9/2004 | Zink et al. |
| 6,793,243 B2 | 9/2004 | Husby |
| 6,796,578 B2 | 9/2004 | White et al. |
| 6,802,527 B2 | 10/2004 | Schmidt et al. |
| 6,802,530 B2 | 10/2004 | Wipasuramonton et al. |
| 6,808,198 B2 | 10/2004 | Schneider et al. |
| 6,823,645 B2 | 11/2004 | Ford |
| 6,824,163 B2 | 11/2004 | Sen et al. |
| 6,825,654 B2 | 11/2004 | Pettypiece, Jr. et al. |
| 6,830,263 B2 | 12/2004 | Xu et al. |
| 6,830,265 B2 | 12/2004 | Ford |
| 6,832,778 B2 | 12/2004 | Pinsenschaum et al. |
| 6,837,079 B1 | 1/2005 | Takeuchi |
| 6,838,870 B2 | 1/2005 | Pettypiece, Jr. et al. |
| 6,840,534 B2 | 1/2005 | Lincoln et al. |
| 6,840,537 B2 | 1/2005 | Xu et al. |
| 6,840,539 B2 | 1/2005 | Pettypiece, Jr. |
| 6,843,503 B2 | 1/2005 | Ford |
| 6,846,005 B2 | 1/2005 | Ford et al. |
| 6,851,374 B1 | 2/2005 | Kelley et al. |
| 6,857,657 B2 | 2/2005 | Canterberry et al. |
| 6,860,509 B2 | 3/2005 | Xu et al. |
| 6,863,298 B2 | 3/2005 | Sakai et al. |
| 6,863,301 B2 | 3/2005 | Ford et al. |
| 6,869,101 B2 | 3/2005 | White et al. |
| 6,871,872 B2 | 3/2005 | Thomas |
| 6,871,874 B2 | 3/2005 | Husby et al. |
| 6,874,812 B2 | 4/2005 | Keutz et al. |
| 6,874,814 B2 | 4/2005 | Hosey et al. |
| 6,877,771 B2 | 4/2005 | Weber |
| 6,882,914 B2 | 4/2005 | Gioutsos et al. |
| 6,886,856 B2 | 5/2005 | Canterberry et al. |
| 6,886,858 B2 | 5/2005 | Olson |
| 6,887,325 B2 | 5/2005 | Canterberry et al. |
| 6,894,483 B2 | 5/2005 | Pettypiece, Jr. et al. |
| 6,905,134 B2 | 6/2005 | Saiguchi et al. |
| 6,908,104 B2 | 6/2005 | Canterberry et al. |
| 6,923,483 B2 | 8/2005 | Curry et al. |
| 6,929,283 B2 | 8/2005 | Gioutsos et al. |
| 6,932,378 B2 | 8/2005 | Thomas |
| 6,932,385 B2 | 8/2005 | Hawthorn et al. |
| 6,935,684 B2 | 8/2005 | Sakai |
| 6,942,244 B2 | 9/2005 | Roychoudhury |
| 6,951,350 B2 | 10/2005 | Heidorn et al. |
| 6,951,532 B2 | 10/2005 | Ford |
| 6,953,204 B2 | 10/2005 | Xu et al. |
| 6,955,377 B2 | 10/2005 | Cooper et al. |
| 6,957,828 B2 | 10/2005 | Keeslar et al. |
| 6,962,363 B2 | 11/2005 | Wang et al. |
| 6,962,364 B2 | 11/2005 | Ju et al. |
| 6,966,576 B1 | 11/2005 | Greenstein |
| 6,974,154 B2 | 12/2005 | Grossert et al. |
| 6,983,956 B2 | 1/2006 | Canterberry et al. |
| 6,994,372 B2 | 2/2006 | Ford et al. |
| 7,007,973 B2 | 3/2006 | Canterberry et al. |
| 7,017,945 B2 | 3/2006 | Depottey et al. |
| 7,021,653 B2 | 4/2006 | Burdock et al. |
| 7,029,024 B2 | 4/2006 | Baumbach |
| 7,036,844 B2 | 5/2006 | Hammer et al. |
| 7,044,500 B2 | 5/2006 | Kalandek et al. |
| 7,044,502 B2 | 5/2006 | Trevillyan et al. |
| 7,048,298 B2 | 5/2006 | Arwood et al. |
| 7,052,034 B2 | 5/2006 | Lochmann |
| 7,055,856 B2 | 6/2006 | Ford et al. |
| 7,063,350 B2 | 6/2006 | Steimke et al. |
| 7,070,203 B2 | 7/2006 | Fisher et al. |
| 7,081,692 B2 | 7/2006 | Pettypiece, Jr. et al. |
| 7,090,246 B2 | 8/2006 | Lincoln et al. |
| 7,107,133 B2 | 9/2006 | Fisher et al. |
| 7,121,581 B2 | 10/2006 | Xu et al. |
| 7,121,628 B2 | 10/2006 | Lo |
| 7,131,662 B2 | 11/2006 | Fisher et al. |
| 7,131,664 B1 | 11/2006 | Pang et al. |
| 7,134,691 B2 | 11/2006 | Dunkle et al. |
| 7,147,245 B2 | 12/2006 | Flörsheimer et al. |
| 7,152,880 B1 | 12/2006 | Pang et al. |
| 7,163,236 B2 | 1/2007 | Masuda et al. |
| 7,172,213 B2 | 2/2007 | Kreuzer et al. |
| 7,198,285 B2 | 4/2007 | Hochstein-Lenzen |
| 7,198,293 B2 | 4/2007 | Olson |
| 7,213,836 B2 | 5/2007 | Coon et al. |
| 7,216,891 B2 | 5/2007 | Biglino |
| 7,216,892 B2 | 5/2007 | Baumbach et al. |
| 7,222,877 B2 | 5/2007 | Wipasuramonton et al. |
| 7,255,364 B2 | 8/2007 | Bonam et al. |
| 7,261,315 B2 | 8/2007 | Hofmann et al. |
| 7,261,316 B1 | 8/2007 | Salmo et al. |
| 7,261,319 B2 | 8/2007 | Depottey et al. |
| 7,264,268 B2 | 9/2007 | Ehrke et al. |
| 7,264,269 B2 | 9/2007 | Gu et al. |
| 7,267,361 B2 | 9/2007 | Hofmann et al. |
| 7,270,344 B2 | 9/2007 | Schirholz et al. |
| 7,275,763 B2 | 10/2007 | Thomas et al. |
| 7,278,656 B1 | 10/2007 | Kalandek |
| 7,281,733 B2 | 10/2007 | Pieruch |
| 7,303,206 B2 | 12/2007 | Kippschull et al. |
| 7,318,599 B2 | 1/2008 | Magdun |
| 7,320,479 B2 | 1/2008 | Trevillyan et al. |
| 7,325,829 B2 | 2/2008 | Kelley et al. |
| 7,328,915 B2 | 2/2008 | Smith et al. |
| 7,341,276 B2 | 3/2008 | Kelley et al. |
| 7,347,449 B2 | 3/2008 | Rossbach et al. |
| 7,350,806 B2 | 4/2008 | Ridolfi et al. |
| 7,354,064 B2 | 4/2008 | Block et al. |
| 7,360,791 B2 | 4/2008 | Yamada |
| 7,367,590 B2 | 5/2008 | Koning et al. |
| 7,380,817 B2 | 6/2008 | Poli et al. |
| 7,390,018 B2 | 6/2008 | Ridolfi et al. |
| 7,398,994 B2 | 7/2008 | Poli et al. |
| 7,401,805 B2 | 7/2008 | Coon et al. |
| 7,401,808 B2 | 7/2008 | Rossbach et al. |
| 7,404,572 B2 | 7/2008 | Salmo et al. |
| 7,407,183 B2 | 8/2008 | Ford et al. |
| 7,413,220 B2 | 8/2008 | Itoga et al. |
| 7,431,332 B2 | 10/2008 | Wipasuramonton et al. |
| 7,445,237 B2 | 11/2008 | Boyle et al. |
| 7,452,002 B2 | 11/2008 | Baumbach et al. |
| 7,458,607 B2 | 12/2008 | Abe et al. |
| 7,481,452 B2 | 1/2009 | Itoga et al. |
| 7,497,462 B2 | 3/2009 | Sakai et al. |
| 7,497,469 B2 | 3/2009 | Fischer et al. |
| 7,506,891 B2 | 3/2009 | Quioc et al. |
| 7,513,524 B2 | 4/2009 | Oota et al. |
| 7,533,897 B1 | 5/2009 | Xu et al. |
| 7,549,674 B2 | 6/2009 | Yoshikawa et al. |
| 7,557,052 B2 | 7/2009 | Konishi et al. |
| 7,594,675 B2 | 9/2009 | Bostrom et al. |
| 7,600,782 B2 | 10/2009 | Ishiguro et al. |

(56) References Cited

U.S. PATENT DOCUMENTS

| | | |
|---|---|---|
| 7,607,690 B2 | 10/2009 | Abe et al. |
| 7,614,653 B2 | 11/2009 | Rose et al. |
| 7,625,008 B2 | 12/2009 | Pang et al. |
| 7,641,233 B2 | 1/2010 | Korechika |
| 7,648,167 B2 | 1/2010 | Bouquier et al. |
| 7,658,400 B2 | 2/2010 | Wipasuramonton et al. |
| 7,658,406 B2 | 2/2010 | Townsend et al. |
| 7,658,407 B2 | 2/2010 | Ford et al. |
| 7,658,409 B2 | 2/2010 | Ford et al. |
| 7,661,697 B2 | 2/2010 | Itoga |
| 7,665,761 B1 | 2/2010 | Green et al. |
| 7,669,897 B2 | 3/2010 | Sano |
| 7,681,914 B2 | 3/2010 | Maidel et al. |
| 7,681,917 B2 | 3/2010 | Guillo et al. |
| 7,703,796 B2 | 4/2010 | Manire et al. |
| 7,708,312 B2 | 5/2010 | Kalandek |
| 7,722,079 B2 | 5/2010 | Lee et al. |
| 7,726,685 B2 | 6/2010 | Kumagai et al. |
| 7,740,274 B2 | 6/2010 | Manssart |
| 7,753,402 B2 | 7/2010 | Volkmann et al. |
| 7,789,417 B2 | 9/2010 | Yoshikawa et al. |
| 7,789,418 B2 | 9/2010 | Wipasuramonton et al. |
| 7,798,522 B2 | 9/2010 | Itoga |
| 7,806,428 B2 | 10/2010 | Yoshikawa et al. |
| 7,837,223 B2 | 11/2010 | Shilliday et al. |
| 7,845,678 B2 | 12/2010 | Pausch et al. |
| 7,845,681 B2 | 12/2010 | Abe et al. |
| 7,857,347 B2 | 12/2010 | Abe et al. |
| 7,874,583 B2 | 1/2011 | Sahm et al. |
| 7,878,538 B2 | 2/2011 | Abe et al. |
| 7,883,106 B2 | 2/2011 | Mical |
| 7,883,109 B2 | 2/2011 | Parks et al. |
| 7,922,197 B2 | 4/2011 | Fukawatase et al. |
| 7,931,297 B2 | 4/2011 | Abe et al. |
| 7,954,850 B2 | 6/2011 | Fischer et al. |
| 7,976,058 B2 | 7/2011 | Suzuki et al. |
| 7,980,590 B2 | 7/2011 | Foubert et al. |
| 7,997,611 B2 | 8/2011 | Dufaut et al. |
| 8,020,889 B2 | 9/2011 | Bauer et al. |
| 8,020,891 B2 | 9/2011 | Fukawatase et al. |
| 8,070,183 B2 | 12/2011 | Kumagai et al. |
| 8,152,199 B2 | 4/2012 | Bauer et al. |
| 8,210,566 B2 | 7/2012 | Fukawatase et al. |
| 8,262,130 B2 | 9/2012 | Fischer et al. |
| 8,267,424 B2 | 9/2012 | Tomitaka et al. |
| 8,272,664 B2 | 9/2012 | Benny et al. |
| 8,353,532 B2 | 1/2013 | Abe et al. |
| 8,382,154 B2 | 2/2013 | Suzuki et al. |
| 8,408,494 B2 | 4/2013 | Garcia et al. |
| 8,414,018 B2 | 4/2013 | Choi et al. |
| 8,419,054 B2 | 4/2013 | Abe et al. |
| 8,434,786 B2 | 5/2013 | Jang et al. |
| 8,439,398 B2 | 5/2013 | Baca |
| 8,466,579 B2 | 6/2013 | Petitpierre |
| 8,500,163 B2 | 8/2013 | Mallinger et al. |
| 8,523,220 B1 | 9/2013 | Gehret et al. |
| 8,528,932 B2 | 9/2013 | Islam et al. |
| 8,556,291 B2 | 10/2013 | Islam et al. |
| 8,573,642 B2 | 11/2013 | Suzuki et al. |
| 8,579,324 B2 | 11/2013 | Kwon et al. |
| 8,608,197 B2 | 12/2013 | Hofmann et al. |
| 8,622,417 B1 | 1/2014 | Schneider et al. |
| 8,646,808 B2 | 2/2014 | Williams et al. |
| 8,651,521 B2 | 2/2014 | Kühne et al. |
| 8,657,334 B2 | 2/2014 | Mallinger et al. |
| 8,672,349 B2 | 3/2014 | Mendez et al. |
| 8,684,403 B2 | 4/2014 | Boyle et al. |
| 8,684,404 B2 | 4/2014 | Fischer et al. |
| 8,684,407 B2 | 4/2014 | Fischer et al. |
| 8,690,188 B2 | 4/2014 | Fiore |
| 8,702,121 B2 | 4/2014 | Yamashita et al. |
| 8,727,061 B2 | 5/2014 | Rydsmo et al. |
| 8,727,377 B2 | 5/2014 | Wang et al. |
| 8,727,378 B2 | 5/2014 | Hiruta et al. |
| 8,740,244 B2 | 6/2014 | Obadia |
| 8,746,736 B2 | 6/2014 | Mendez et al. |
| 8,851,511 B1 | 10/2014 | Volkmann et al. |
| 8,882,141 B2 | 11/2014 | Arnold et al. |
| 8,882,143 B2 | 11/2014 | Potter et al. |
| 8,888,126 B2 | 11/2014 | Nukaya et al. |
| 8,894,095 B1 | 11/2014 | Meister et al. |
| 8,919,811 B2 | 12/2014 | Langer et al. |
| 8,939,465 B2 | 1/2015 | Kastelic et al. |
| 8,955,914 B2 | 2/2015 | Meister et al. |
| 9,027,962 B1 | 5/2015 | Jang |
| 9,079,559 B2 | 7/2015 | Iwamoto et al. |
| 9,096,193 B2 | 8/2015 | Kalandek |
| 9,108,590 B2 | 8/2015 | Williams et al. |
| 9,126,510 B2 | 9/2015 | Hirako |
| 9,174,603 B2 | 11/2015 | Fischer et al. |
| 9,187,056 B1 | 11/2015 | Kwon |
| 9,199,602 B1 | 12/2015 | Fischer et al. |
| 9,227,592 B2 | 1/2016 | Polcwiartek et al. |
| 9,272,685 B2 | 3/2016 | Fischer et al. |
| 9,327,674 B2 | 5/2016 | Fischer et al. |
| 9,333,939 B2 | 5/2016 | Murakami et al. |
| 9,340,177 B2 | 5/2016 | Hiruta et al. |
| 9,352,721 B2 | 5/2016 | Jang |
| 9,376,081 B2 | 6/2016 | Choi |
| 9,376,086 B2 | 6/2016 | Burger et al. |
| 9,393,924 B2 | 7/2016 | Choi |
| 9,403,503 B2 | 8/2016 | Buchholz et al. |
| 9,434,345 B2 | 9/2016 | Koshikawa et al. |
| 9,434,346 B2 | 9/2016 | Hoffmann et al. |
| 9,475,451 B2 | 10/2016 | Kwon |
| 9,499,119 B2 | 11/2016 | Ishiguro et al. |
| 9,555,726 B2 | 1/2017 | Jafri et al. |
| 9,555,764 B2 | 1/2017 | Maruoka et al. |
| 9,561,775 B2 | 2/2017 | Kim et al. |
| 9,573,556 B2 | 2/2017 | Ko et al. |
| 9,598,042 B2 | 3/2017 | Schneider et al. |
| 9,616,839 B2 | 4/2017 | Khouphongsy et al. |
| 9,650,012 B2 | 5/2017 | Fukurono et al. |
| 9,656,752 B2 | 5/2017 | Valdes et al. |
| 2001/0028161 A1 | 10/2001 | Hoagland |
| 2001/0048215 A1 | 12/2001 | Breed et al. |
| 2002/0011723 A1 | 1/2002 | Lewis |
| 2002/0024200 A1 | 2/2002 | Eckert et al. |
| 2002/0067031 A1 | 6/2002 | Busgen et al. |
| 2002/0089152 A1 | 7/2002 | Khoudari et al. |
| 2002/0101067 A1 | 8/2002 | Breed |
| 2002/0125700 A1 | 9/2002 | Adkisson |
| 2002/0125701 A1 | 9/2002 | Devonport |
| 2002/0125705 A1 | 9/2002 | Wong et al. |
| 2002/0140209 A1 | 10/2002 | Waid et al. |
| 2003/0127839 A1 | 7/2003 | Jenkins et al. |
| 2003/0168837 A1 | 9/2003 | Schneider et al. |
| 2003/0178821 A1 | 9/2003 | Schneider et al. |
| 2004/0051280 A1 | 3/2004 | Anaya et al. |
| 2004/0164525 A1 | 8/2004 | Gray et al. |
| 2004/0164532 A1 | 8/2004 | Heidorn et al. |
| 2004/0178614 A1 | 9/2004 | Countryman et al. |
| 2004/0188988 A1 | 9/2004 | Wipasuramonton et al. |
| 2005/0006884 A1 | 1/2005 | Cooper et al. |
| 2005/0098990 A1 | 5/2005 | Pinsenschaum et al. |
| 2005/0146119 A1 | 7/2005 | Ford et al. |
| 2005/0212270 A1 | 9/2005 | Wipasuramonton et al. |
| 2005/0218635 A1 | 10/2005 | Wipasuramonton et al. |
| 2005/0248135 A1 | 11/2005 | Poli et al. |
| 2006/0108775 A1 | 5/2006 | Schirholz et al. |
| 2006/0119084 A1 | 6/2006 | Coon et al. |
| 2006/0175816 A1 | 8/2006 | Spencer et al. |
| 2006/0186644 A1 | 8/2006 | Manire et al. |
| 2006/0220360 A1 | 10/2006 | Ridolfi et al. |
| 2006/0255569 A1 | 11/2006 | Weissert et al. |
| 2006/0255570 A1 | 11/2006 | Wipasuramonton et al. |
| 2006/0267325 A1 | 11/2006 | Kumagai et al. |
| 2006/0282203 A1 | 12/2006 | Hasebe et al. |
| 2007/0001435 A1 | 1/2007 | Gray et al. |
| 2007/0001437 A1 | 1/2007 | Wall et al. |
| 2007/0013175 A1 | 1/2007 | Suyama et al. |
| 2007/0075534 A1 | 4/2007 | Kelley et al. |
| 2007/0075535 A1 | 4/2007 | Trevillyan et al. |
| 2007/0075536 A1 | 4/2007 | Kelley et al. |

(56) References Cited

U.S. PATENT DOCUMENTS

| | | |
|---|---|---|
| 2007/0080528 A1 | 4/2007 | Itoga et al. |
| 2007/0085309 A1 | 4/2007 | Kelley et al. |
| 2007/0102909 A1* | 5/2007 | Nezaki ................... B60R 21/18 280/733 |
| 2007/0108753 A1 | 5/2007 | Pang et al. |
| 2007/0138775 A1 | 6/2007 | Rossbach et al. |
| 2007/0138776 A1 | 6/2007 | Rossbach et al. |
| 2007/0152428 A1 | 7/2007 | Poli et al. |
| 2007/0170717 A1 | 7/2007 | Dirassuian |
| 2007/0182137 A1 | 8/2007 | Hiroshige et al. |
| 2007/0200329 A1 | 8/2007 | Ma |
| 2007/0222189 A1 | 9/2007 | Baumbach et al. |
| 2007/0241223 A1 | 10/2007 | Boelstler et al. |
| 2007/0246922 A1 | 10/2007 | Manssart |
| 2008/0018086 A1 | 1/2008 | Ford et al. |
| 2008/0042416 A1 | 2/2008 | Razazi et al. |
| 2008/0054602 A1 | 3/2008 | Yang |
| 2008/0084050 A1 | 4/2008 | Volkmann et al. |
| 2008/0088118 A1 | 4/2008 | Wipasuramonton et al. |
| 2008/0106074 A1 | 5/2008 | Ford |
| 2008/0315567 A1 | 12/2008 | Fischer et al. |
| 2009/0020032 A1 | 1/2009 | Trevillyan |
| 2009/0020197 A1 | 1/2009 | Hosey |
| 2009/0051149 A1 | 2/2009 | Kalandek et al. |
| 2009/0051150 A1 | 2/2009 | Murakami |
| 2009/0058052 A1 | 3/2009 | Ford et al. |
| 2009/0066063 A1 | 3/2009 | Mical |
| 2009/0111341 A1 | 4/2009 | Rodriguez |
| 2009/0236828 A1 | 9/2009 | Foubert et al. |
| 2009/0289479 A1 | 11/2009 | Kumagai et al. |
| 2010/0066060 A1 | 3/2010 | Kalandek |
| 2010/0084840 A1 | 4/2010 | Ohlsson et al. |
| 2010/0102542 A1 | 4/2010 | Nakajima et al. |
| 2010/0115737 A1 | 5/2010 | Foubert |
| 2010/0164208 A1 | 7/2010 | Kalandek |
| 2010/0276540 A1 | 11/2010 | Rojo |
| 2011/0031723 A1 | 2/2011 | Fischer et al. |
| 2011/0049850 A1 | 3/2011 | Horikawa et al. |
| 2011/0233980 A1 | 9/2011 | Hoshi et al. |
| 2011/0285115 A1 | 11/2011 | Putala et al. |
| 2012/0038137 A1 | 2/2012 | Wipasuramonton et al. |
| 2012/0074677 A1 | 3/2012 | Hiruta et al. |
| 2012/0091764 A1 | 4/2012 | Cailleteau et al. |
| 2012/0256399 A1 | 10/2012 | Kokeguchi |
| 2012/0256403 A1 | 10/2012 | Shields |
| 2012/0261911 A1 | 10/2012 | Baca et al. |
| 2013/0009430 A1 | 1/2013 | Islam et al. |
| 2013/0015642 A1 | 1/2013 | Islam et al. |
| 2013/0015686 A1 | 1/2013 | Islam et al. |
| 2013/0026803 A1 | 1/2013 | Islam et al. |
| 2013/0075524 A1 | 3/2013 | Islam et al. |
| 2013/0088056 A1 | 4/2013 | Quatanens et al. |
| 2013/0093221 A1 | 4/2013 | Ligonniere et al. |
| 2013/0106079 A1 | 5/2013 | Jarboe et al. |
| 2013/0106080 A1 | 5/2013 | Jarboe et al. |
| 2013/0119645 A1 | 5/2013 | Eckert et al. |
| 2013/0134697 A1 | 5/2013 | Choi et al. |
| 2013/0147167 A1 | 6/2013 | Kwon et al. |
| 2013/0187646 A1 | 7/2013 | Baca et al. |
| 2013/0197746 A1 | 8/2013 | Glueck et al. |
| 2013/0221644 A1 | 8/2013 | Beattie et al. |
| 2013/0241180 A1 | 9/2013 | Gehret et al. |
| 2013/0307253 A1 | 11/2013 | Shin et al. |
| 2013/0307279 A1 | 11/2013 | De Morais et al. |
| 2013/0341975 A1 | 12/2013 | Schneider et al. |
| 2014/0027574 A1 | 1/2014 | Obadia et al. |
| 2014/0063255 A1 | 3/2014 | Breed et al. |
| 2014/0077478 A1 | 3/2014 | Islam et al. |
| 2014/0159356 A1 | 6/2014 | Kastelic et al. |
| 2015/0014969 A1 | 1/2015 | Choi |
| 2015/0042078 A1 | 2/2015 | Gehret et al. |
| 2015/0123385 A1 | 5/2015 | Frelsler et al. |
| 2015/0232184 A1 | 8/2015 | Gehret et al. |
| 2016/0001735 A1 | 1/2016 | Quatanens et al. |
| 2016/0052636 A1 | 2/2016 | Moeller et al. |
| 2016/0096627 A1 | 4/2016 | Gehret et al. |
| 2016/0288756 A1 | 10/2016 | Ishiguro et al. |
| 2017/0028960 A1 | 2/2017 | Kobayashi et al. |
| 2017/0072897 A1 | 3/2017 | Kruse et al. |
| 2017/0088087 A1 | 3/2017 | Williams |
| 2017/0129445 A1 | 5/2017 | Kim |
| 2017/0197578 A1 | 7/2017 | Hatfield |
| 2017/0225788 A1 | 8/2017 | Humbert |

FOREIGN PATENT DOCUMENTS

| | | | |
|---|---|---|---|
| DE | 4019596 A1 | 1/1992 | |
| DE | 4116162 A1 | 11/1992 | |
| DE | 4218252 A1 | 12/1992 | |
| DE | 4211209 A1 | 10/1993 | |
| DE | 4329275 A1 | 3/1995 | |
| DE | 19742151 A1 | 4/1998 | |
| DE | 29912578 U1 | 5/2000 | |
| DE | 10041042 A1 | 5/2001 | |
| EP | 0639481 A1 | 2/1995 | |
| EP | 0684168 A1 | 11/1995 | |
| EP | 0765780 A1 | 4/1997 | |
| EP | 1101660 A1 | 5/2001 | |
| EP | 1712427 A1 | 10/2006 | |
| EP | 1767396 A1 | 3/2007 | |
| EP | 2028103 A2 | 2/2009 | |
| EP | 2543556 A1 | 1/2013 | |
| EP | 2546111 A1 | 1/2013 | |
| EP | 2572994 A2 | 3/2013 | |
| EP | 2581276 A1 | 4/2013 | |
| EP | 2636597 A2 | 9/2013 | |
| EP | 2543557 B1 | 4/2014 | |
| EP | 2596995 B1 | 9/2014 | |
| EP | 2914460 B1 | 12/2016 | |
| FR | 2703011 A1 | 9/1994 | |
| GB | 1362672 A | 8/1974 | |
| GB | 2306876 A | 5/1997 | |
| GB | 2368050 A | 4/2002 | |
| GB | 2410009 A | 7/2005 | |
| JP | 63258239 A | 10/1988 | |
| JP | 1083436 A | 3/1989 | |
| JP | 6483436 | 3/1989 | |
| JP | 11189117 A | 7/1999 | |
| JP | 2000142303 A * | 5/2000 | |
| JP | 2009001064 A | 1/2009 | |
| JP | 2011051413 A | 3/2011 | |
| JP | 2011126381 A | 6/2011 | |
| JP | 2016222203 A * | 12/2016 | ............ B60R 21/18 |
| WO | 8807947 A1 | 10/1988 | |
| WO | 9813226 A1 | 4/1998 | |
| WO | 9841426 A1 | 9/1998 | |
| WO | 939940 A1 | 8/1999 | |
| WO | 9942336 A1 | 8/1999 | |
| WO | 0100456 A1 | 1/2001 | |
| WO | 0168413 A1 | 9/2001 | |
| WO | 2013012890 A1 | 1/2013 | |
| WO | 2013019248 A2 | 2/2013 | |
| WO | 2013128430 A1 | 9/2013 | |
| WO | 2014024046 A2 | 2/2014 | |
| WO | 2015170841 A1 | 11/2015 | |
| WO | 2016032971 A1 | 3/2016 | |
| WO | 2016041783 | 3/2016 | |
| WO | 2017017278 | 7/2016 | |

OTHER PUBLICATIONS

"Takata Melds Air Bag with Seat Belt," The Japan Times, Nov. 27, 2010, 1 page.

Federal Aviation Administration (FAA) policy statement PS-ANM-25-03, Technical Criteria for Approving Side-Facing Seats, dated Jun. 8, 2012.

Grierson et al., Simula's Line of Inflatable Restraint Technologies, TTCP Technical Report Proceedings of the Workshop: Inflatable Restraints in Aviation, May 2000, pp. 41-51.

Minicooper Manual dated 2006.

(56) References Cited

OTHER PUBLICATIONS

Renault Espce Manual dated 2002.

* cited by examiner

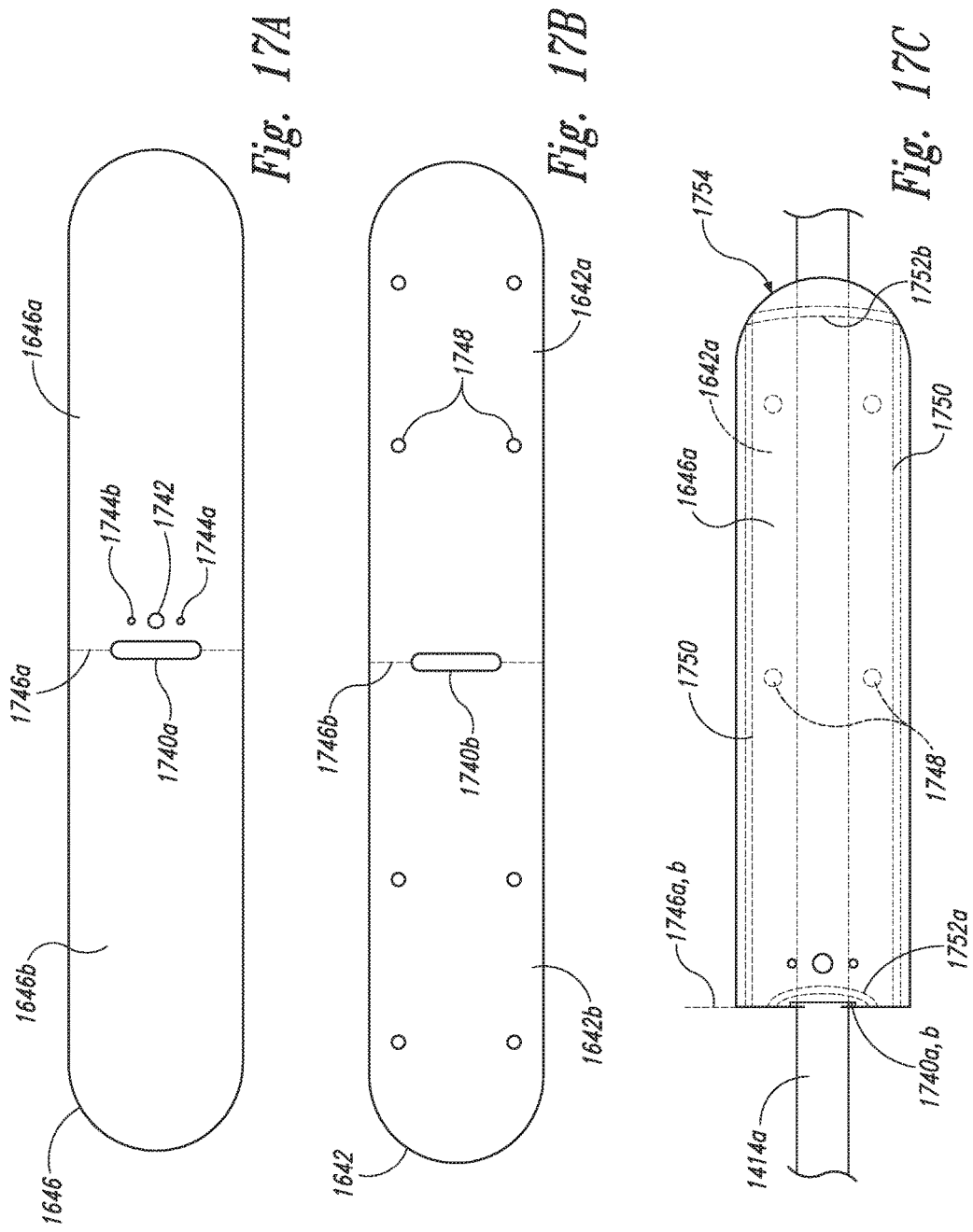

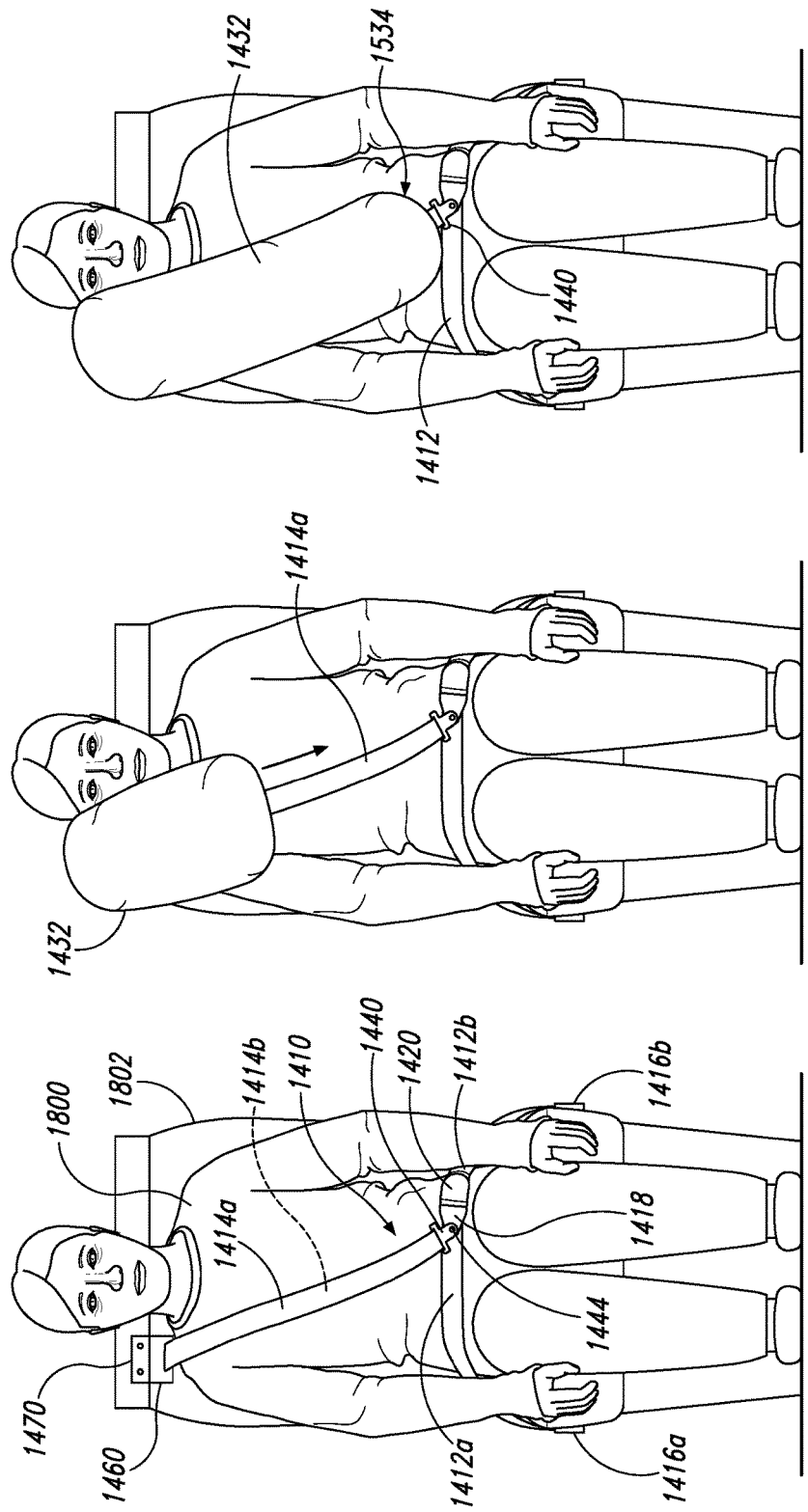

EXTENDING PASS-THROUGH AIRBAG OCCUPANT RESTRAINT SYSTEMS, AND ASSOCIATED SYSTEMS AND METHODS

CROSS-REFERENCE TO RELATED APPLICATION(S) INCORPORATED BY REFERENCE

The present application claims priority to and the benefit of U.S. Provisional Application No. 62/139,684, filed Mar. 28, 2015, and titled EXTENDING PASS-THROUGH AIRBAG OCCUPANT RESTRAINT SYSTEMS, AND ASSOCIATED SYSTEMS AND METHODS, which is incorporated herein by reference in its entirety.

TECHNICAL FIELD

The following disclosure relates generally to occupant restraint systems for use in aircraft, land vehicles, and other vehicles and, more particularly, to vehicle occupant restraint systems that include airbags.

BACKGROUND

Airbags can provide protection for occupants in many different types of vehicles during accidents or collisions. In cars, for example, airbags can deploy from the steering column, dashboard, side panel, etc., to protect the driver and/or passengers. During a sudden deceleration of the car, such as in a collision, the airbag rapidly inflates and deploys in front of, or to the side of, the driver and/or passengers.

Although a seat belt will generally restrain a person during an accident, an airbag can provide additional protection. An airbag positioned in the steering column, for example, can expand in front of the driver to cushion his torso and head. The airbag can prevent the driver's head from hitting the steering wheel, and can also reduce the likelihood of whiplash. Airbags can also be deployed to provide protection from side impact collisions.

Although the airbags described above are common in automobiles, other types of airbags may be useful in other types of vehicles. These other types of airbags may be useful because airbags that deploy from a specific location in an automobile (e.g., from the steering column) may not be effective in other types of vehicles (e.g., aircraft), for other types of impact or accident scenarios, or for other types of seating arrangements (e.g., side-facing seats). To accommodate different vehicles, different impact directions, and/or different occupant positions, airbags have been developed that deploy from seat belts. For example, some airbags can deploy from a lap belt or shoulder belt to provide additional protection during a sudden deceleration. These seat belt-deployable airbags can be used in various types of vehicles, including aircraft (e.g., airplanes in forward, aft, and/or side-facing seats), over-road vehicles (e.g., military land vehicles, passenger cars), etc.

Certain safety regulations set forth criteria for aircraft occupant restraint systems. For example, FAA advisory circular 25.562-1B, Dynamic Evaluation of Seat Restraint Systems and Occupant Protection on Transport Airplanes, section 13, Pass/Fail Criteria, dated Jan. 10, 2006, states in part: "b. If the ATD's head is exposed to impact with interior features during the test, a HIC of 1,000 is not exceeded. c. Where upper torso restraint straps are used, tension loads in individual straps do not exceed 1,750 lbs (7.78 kN). If dual straps are used for restraining the upper torso, the total strap tension load does not exceed 2,000 lbs (8.90 kN)." Also, FAA policy statement PS-ANM-25-03, Technical Criteria for Approving Side-Facing Seats, dated Jun. 8, 2012, sets forth criteria for side-facing seats. Some embodiments of the airbag systems described herein can address these criteria.

BRIEF DESCRIPTION OF THE DRAWINGS

FIGS. 17A and 17B are plan views of flat patterns of airbag panels, and FIG. 17C is a corresponding assembly view of the airbag panels, configured in accordance with an embodiment of the present technology.

FIGS. 18A-18C are a series of time-sequenced front views of a vehicle occupant secured in a vehicle seat by the occupant restraint system of FIGS. 14-16B at various stages of airbag deployment in accordance with an embodiment of the present technology.

DETAILED DESCRIPTION

Figure 1A:
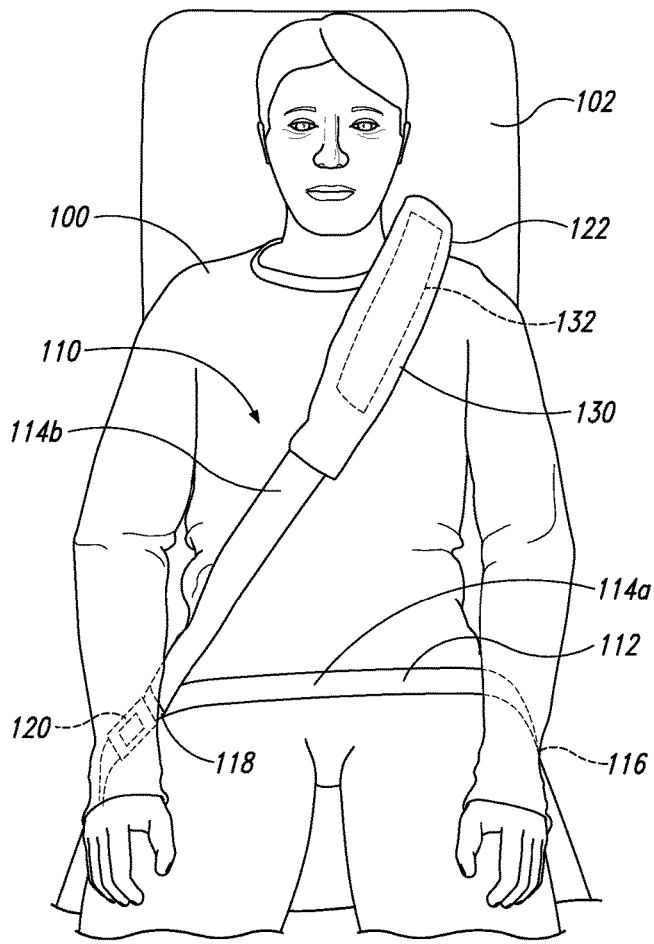
FIG. 1A is a front view of a vehicle occupant restraint system having an airbag assembly configured in accordance with an embodiment of the present technology.

The following disclosure describes various embodiments of vehicle occupant restraint systems that include a compact, web-mounted (e.g., shoulder belt-mounted) airbag that can be deployed during a crash event to reduce head excursion, web loads, and/or mitigate HIC (Head Injury Criterion). In some embodiments, the airbag can be constructed with a passage extending through it that is sized to accommodate a conventional seat belt web. When stowed, the airbag can be carried on or near, for example, a shoulder belt (which can also be referred to as a shoulder harness, strap, web, etc.) that extends through the passage. The stowed airbag can also be attached to a seat or vehicle structure at or near, for example, the top of the occupant seat, thereby allowing the belt to move back and forth through the stowed airbag while the airbag remains in a desired position relative to the seat occupant. For example, in some embodiments the airbag can be stowed in a housing mounted near (e.g., directly above) one of the occupant's shoulders. In other embodiments, a direct attachment to the seat or vehicle structure can be omitted, and a stop bar or similar feature can be attached to the shoulder belt in such a position that it engages the airbag assembly and pulls it into position when the seat occupant pulls the belt across his or her chest for use.

In the foregoing embodiments, when the airbag system is activated in response to an accident or other dynamic event, the airbag inflates radially and then downwardly along the webbing (of, e.g., the shoulder belt) across the occupant's chest. In some embodiments, such airbags can be referred as "extending, pass-through airbags" because the web portion (e.g., the seat belt) passes through the airbag, and the airbag extends along the length of the web as the airbag deploys. As described in greater detail below, embodiments of the seat belt-mounted airbag systems disclosed herein can have relatively small packaging sizes when stowed, yet still provide head and chest protection over substantially the length of the shoulder belt when deployed. The smaller packaging sizes can facilitate relatively easy stowage and reduce the possibility of potential airbag damage from, for example, a door in an airplane, land vehicle, or other vehicle.

Certain details are set forth in the following description and in FIGS. 1A-18C to provide a thorough understanding of various embodiments of the present technology. In other instances, well-known structures, materials, operations and/ or systems often associated with, for example, airbags, airbag initiation and inflation systems, seat belts, occupant restraint systems, etc. are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention.

Many of the details, dimensions, angles and other features shown in the Figures are merely illustrative of particular embodiments of the disclosure. Accordingly, other embodiments can have other details, dimensions, angles and features without departing from the spirit or scope of the present invention. In addition, those of ordinary skill in the art will appreciate that further embodiments of the invention can be practiced without several of the details described below.

In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1A.

FIG. 1A is a front view of a vehicle occupant restraint system 110 having an airbag assembly 130 configured in accordance with an embodiment of the present technology. In the illustrated embodiment, the restraint system 110 secures a vehicle occupant 100 in a seat 102 of a vehicle. The vehicle can be, for example, an aircraft (e.g., a commercial passenger airplane, private aircraft, helicopter, etc.), a land vehicle (e.g., a military vehicle (e.g., a Humvee), passenger car, etc.), or other vehicle. The seat 102 can be a forward-facing, rearward-facing, side-facing, or oblique-facing seat. As used herein, "forward-facing" can refer to a seat that faces the direction of vehicle (e.g., an aircraft) travel; "rearward-facing" can refer to a seat that faces opposite to the direction of travel; "side-facing" can refer to a seat that faces transverse to (or at a right angle to) the direction of travel; and "oblique-facing" can refer to a seat that faces in a direction that is neither parallel to nor at a right angle to the direction of vehicle travel. Accordingly, in the case of an aircraft or other vehicle having a longitudinal axis oriented along the direction of travel, a side-facing seat would be positioned transversely (or at a right angle to) the longitudinal axis, and an oblique-facing seat would be positioned at an angle that is neither parallel to nor perpendicular to the longitudinal axis. In the illustrated embodiment, the restraint system 110 includes a web 112 which forms a lap belt portion 114a and a shoulder belt portion 114b. As used herein, the terms web, belt, harness, strap, can be used synonymously to refer to a flexible member, such as a conventional seat belt, that extends around the occupant 100 to secure them in position. Accordingly, the lap belt portion 114a and a shoulder belt portion 114b can also be referred to as a lap "web" portion 114a and a shoulder "web" portion 114b, respectively. Such "webs" can be made from a woven material (e.g., woven nylon, polyester, etc.) as is well known in the art. In the illustrated embodiment, the web 112 forms a conventional three-point harness in which a first end of the lap belt portion 114a can be fixedly attached to the seat structure or an adjacent vehicle structure at an anchor point 116. The web 112 can carry a conventional seat belt buckle tongue 118 for releasably coupling the web 112 to a conventional seat belt buckle 120 fixedly attached to the seat structure or an adjacent vehicle structure on an opposite side of the seat 102. The shoulder belt portion 114b extends upwardly from the buckle tongue 118 diagonally across the chest of the occupant 100, and can be operably received by a suitable seat belt retractor (not shown) mounted to the backside of the seat 102 or to an adjacent vehicle structure, such as a sidewall or floor.

Figure 1B:
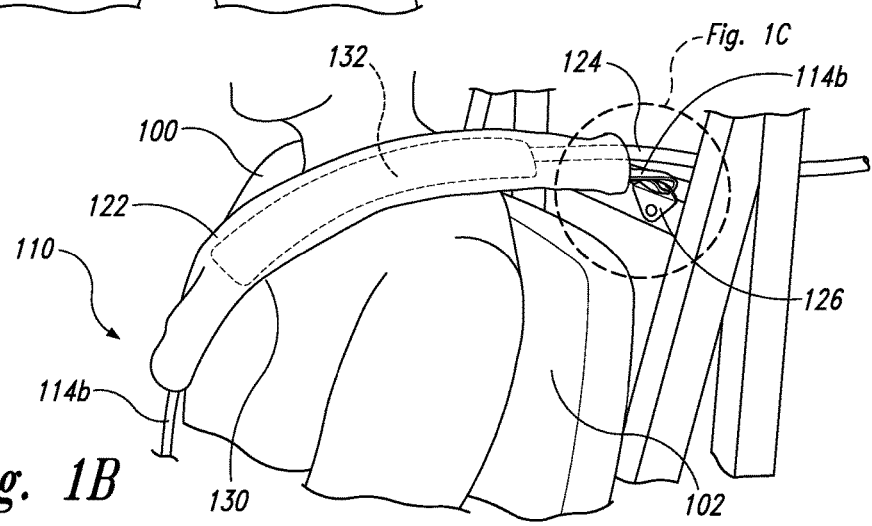
FIG. 1B is an isometric side view of an upper portion of the occupant restraint system.
Figure 1C:
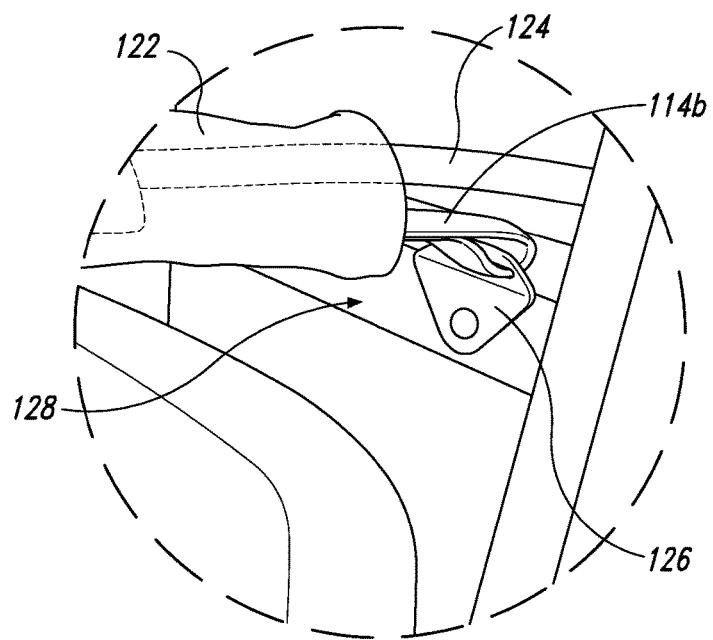
FIG. 1C is an enlarged isometric side view of a portion of the restraint system taken from FIG. 1B.

FIG. 1B is an enlarged side view of an upper portion of the restraint system 110, and FIG. 1C is a further enlarged side view of a portion of the restraint system 110 illustrating attachment of the airbag assembly 130 to the upper seat structure 128 in accordance with an embodiment of the present technology. Referring to FIGS. 1A-1C together, the airbag assembly 130 includes an airbag 132 stowed inside a cover 122. As shown in FIGS. 1B and 1C, a gas delivery hose 124 and/or other suitable fluid passageway extends under the cover 122 and to the airbag 132 from an inflator or other suitable gas source (not shown). In this embodiment, an upper end portion of the airbag 132 can be securely attached to a fitting 126 that is fastened to a seat structure adjacent the upper back portion of the seat 102 behind the occupant's shoulder, and the shoulder belt portion 114b passes generally over the fitting 126 and behind the seat 102 as described in greater detail below.

As described in greater detail below, during normal use of the restraint system 110, the shoulder belt portion 114b is able to slide back and forth or otherwise move relatively freely through the airbag assembly 130 as the occupant puts on and takes off the restraint system 110. More specifically, after sitting in the seat 102 the occupant 100 can grasp the buckle tongue 118 and extract the shoulder belt portion 114b from the retractor positioned behind the seat (not shown). As the shoulder belt portion 114b is extended, it passes through the airbag assembly 130 while the airbag assembly 130 remains relatively in place along the shoulder and upper torso of the occupant 100. After sufficiently extending the should belt portion 114b, the occupant 100 can insert the buckle tongue 118 into the buckle 120 to secure the restraint system 110 as shown in FIG. 1A. When the occupant 100 desires to leave the seat 102, he or she can release the buckle tongue 118 from the buckle 120 (by pressing, for example, a conventional buckle release button, lifting a buckle latch, etc.), thereby letting the shoulder belt portion 114b retract back into the retractor through the airbag assembly 130.

In the event of a vehicle accident or other emergency in which the vehicle experiences an acceleration (or deceleration) above a preset magnitude, a suitable airbag inflation system can inflate the airbag 132 via the gas delivery hose 124. Upon inflation, the airbag 132 expands, initially rupturing and displacing the cover 122 and generally expanding radially (e.g., laterally) away from the shoulder belt portion 114b proximate the shoulder of the occupant 100. As the airbag continues to rapidly inflate, it extends downwardly along the length of the shoulder belt portion 114b toward the buckle tongue 118, as described in greater detail below.

Although a three-point occupant restraint system is depicted in FIGS. 1A-1C for purposes of illustration, the airbag systems described herein can be used with virtually any arrangement of restraint system web. For example, the airbag assembly 130 and variations thereof can be mounted to a lap belt of a two-point or three-point restraint system, or to a shoulder belt of two-point restraint system comprising just the shoulder belt. Similarly, a four-point restraint system having two shoulder belts and a lap belt can include two airbag assemblies 130, one for each shoulder belt, and/or a third airbag assembly 130 for the lap belt. Similarly, a five-point restraint system having two shoulder belts, a lap belt, and one crotch belt can also use the airbag assembly 130 on each individual length of web or any combination of shoulder belt, lap belt, etc. Additionally, although embodiments of the present technology may be described herein in the context of use with a seat (e.g., a forward-facing, rearward-facing, side-facing, or oblique-facing seat) in an aircraft seat (e.g., a passenger airplane, helicopter, etc.), or a land vehicle (e.g., a military personnel carrier, all-terrain vehicle, Humvee, etc.), those of ordinary skill in the art will appreciate that the airbag systems described herein can be used in virtually any manner of vehicle with virtually any type of seating arrangement, seat belt or seat web restraint system arrangement. Accordingly, the present invention is not limited to the particular embodiments of restraint systems, seating arrangements, and/or web configurations illustrated in the Figures and disclosed herein.

Figure 2:
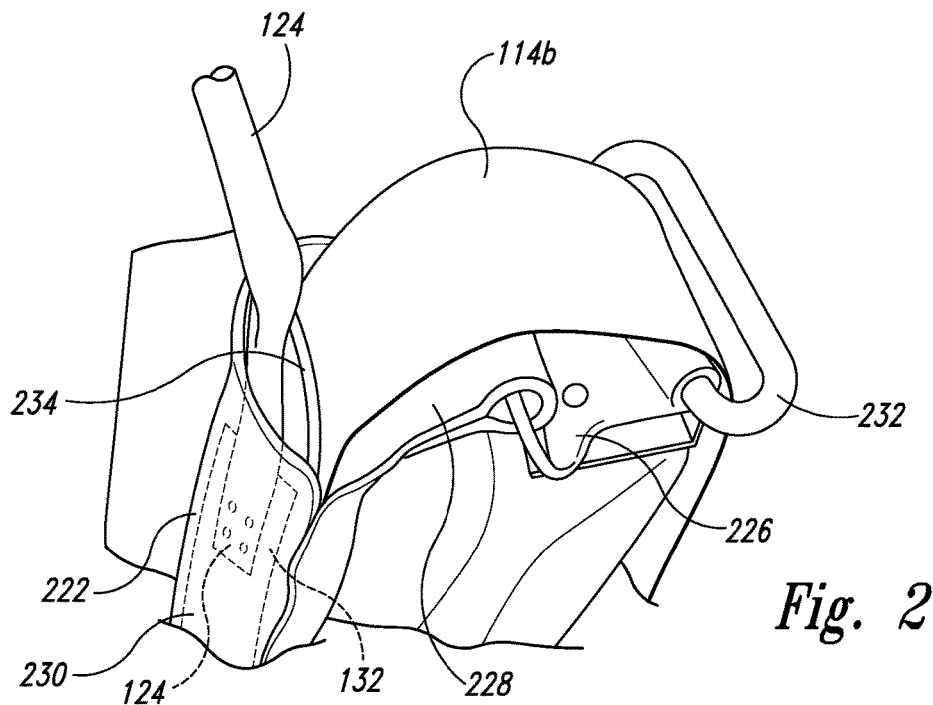
FIG. 2 is a top isometric view of a portion of an occupant restraint system having an airbag assembly configured in accordance with another embodiment of the present technology.

FIG. 2 is an enlarged isometric top view of an upper portion of an airbag assembly 230 operably carried by the shoulder belt portion 114b in accordance with another embodiment of the present technology. The airbag assembly 230 is at least generally similar in structure and function to the airbag assembly 130 described above with reference to FIGS. 1A-1C. For example, the airbag assembly 230 includes a sleeve or sheath 234 that extends through the airbag 132 and around both sides of the shoulder belt portion 114b. The sheath 234 can be made from a fabric material (e.g., airbag material, a woven nylon fabric material, a rubber material, plastic material, and/or other suitable materials). In operation, the sheath 234 provides a passageway or channel through the airbag assembly 230 through which the shoulder belt portion 114b passes. The sheath 234 can protect the airbag 132 and prevent the shoulder belt portion 114b from rubbing against and potentially damaging the airbag 132 as the shoulder belt portion 114b slides back and forth through the airbag assembly 230. As also shown in FIG. 2, in this embodiment the airbag assembly 230 includes an airbag cover 222 having an attachment tab 228. The tab 228 extends around an aperture in a fitting 226 that is fixedly attached to the seat structure, and then is sewn onto itself to securely fasten the cover 222 to the fitting 226. A D-ring 232 is also attached to the seat structure adjacent to the fitting 226, and provides a suitable guide for the shoulder belt portion 114b as it passes over the seat 102.

In the embodiments depicted in FIGS. 1A-2, the airbag assemblies 130 and 230 are attached to the seat (or vehicle) structure proximate the upper portion of the seatback. In other embodiments of the present technology, however, the upper end portion of the airbag assembly 130 can instead be attached (e.g., by stitching, fasteners, etc.) to a fixed position on the shoulder belt portion 114b. In these embodiments, the shoulder belt portion 114b would not pass back and forth through the airbag assembly 130, 230 during normal use. Instead, a sufficiently long section of shoulder belt web would extend from the lower portion of the airbag assembly 130, 230 to that the shoulder belt portion 114b could be properly positioned around the seat occupant 100 and engaged with the buckle 120 for use, and this section of web could be rolled up or otherwise stowed when not in use. A similar configuration can be used with the lap belt portion 114a in accordance with the present technology. For example, the airbag assembly 130 can be attached to the lap belt portion 114a proximate the anchor point 116 (FIG. 1A), and the lap belt portion 114a can include a sufficient length of web extending from the airbag assembly 130 so that the lap belt portion 114a can be properly installed on the seat occupant for use.

Figure 3:
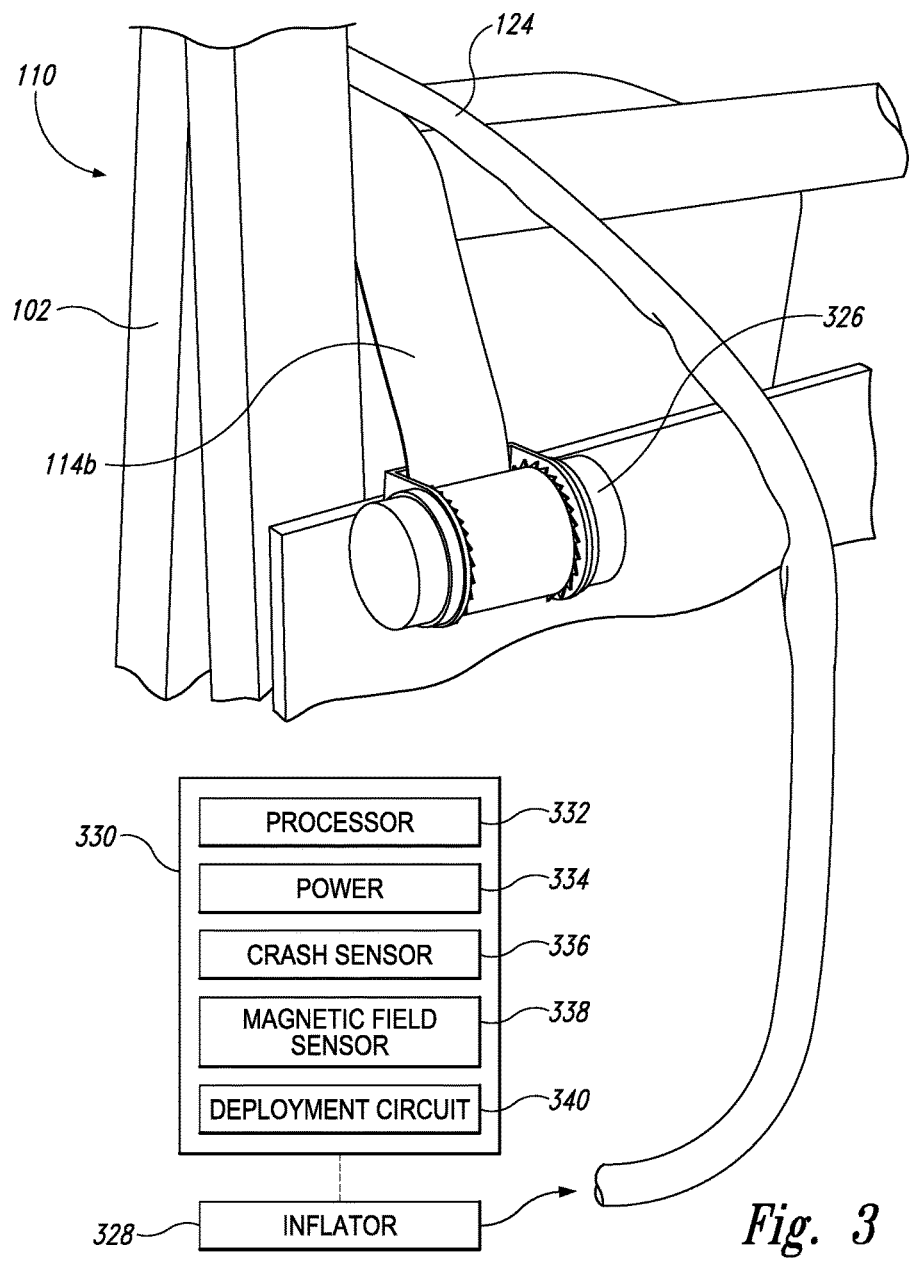
FIG. 3 is a partially schematic rear isometric view of the occupant restraint system of FIGS. 1A-1C, configured in accordance with an embodiment of the present technology.

FIG. 3 is a partially schematic rear isometric view of an upper portion of the occupant seat 102 and an airbag inflation system configured in accordance with an embodiment of the present technology. As noted above in reference to FIGS. 1A-1C, in this embodiment the shoulder belt portion 114b can be operably coupled to a suitable seat belt retractor 326 that can be mounted to the seat structure (e.g., the rear or backside of the seat 102 as shown) or a vehicle structure (e.g., an adjacent wall or floor structure). Suitable seat belt retractors are known in the art, and can include a spring-loaded spool, motorized spool, etc. that can automatically retract the shoulder belt portion 114b, pay out the shoulder belt portion 114b, and lock (and/or pretension) in response to an accident event.

In the illustrated embodiment, the restraint system 110 further includes an airbag inflator 328 (shown schematically), and an electronic assembly (e.g., an electronics module assembly (EMA); also shown schematically) operably coupled to the inflator 328 for initiating airbag inflation in response to an accident event. The inflator 328 can include a container of compressed gas (e.g., air) and a pyrotechnic device (e.g., a squib connector) that can be activated by a signal sent by the electronic assembly 330 in response to a crash event. The signal initiates the squib, which causes the container to release the pressurized and expanding gas into the airbag 132 (FIG. 1A) via the gas delivery hose 124. In other embodiments, the inflator 328 can include other suitable initiation and/or inflation devices known in the art, such as gas-generating inflators.

In various embodiments, the inflator 328 can be spaced apart from the airbag 132 and fluidly coupled thereto by the gas delivery hose 124 and/or other suitable fluid passageways. For example, the inflator 328 can be positioned at or near the backside of the seat 102, under the seat 102, or other suitable location and mounted to a seat or vehicle structure. The gas delivery hose 124 can include a first end portion in fluid communication with the interior of the airbag 132, and a second end fitting threadably or otherwise engaged with an outlet of the inflator 328. The gas delivery hose 124 can have suitable dimensions for rapid gas delivery to the airbag 132 depending at least in part on the distance between the inflator 328 and the airbag assembly 130. The gas delivery hose 124 can be made from a suitable flexible material as known in the art. In certain embodiments, for example, the gas delivery hose 124 may have an inflated outer diameter of 0.5 inch to 1.0 inch, such as about 0.75 inch.

In the illustrated embodiment, the electronic assembly 330 includes a processor 332 that receives electrical power from a power source 334 (e.g., one or more batteries, such as lithium batteries), a deployment circuit 340 that initiates the inflator 328, and at least one crash sensor 336 that detects rapid decelerations and/or other crash events above preset or predetermined magnitude. The crash sensor 336, for example, can include a spring-mass damper type sensor with an inertial switch calibrated for the vehicle's operating environments that initiates airbag deployment upon a predetermined deceleration level. In other embodiments, the crash sensor 336 can include other types of sensors known in the art. Optionally, the electronics assembly 330 can also include one or more magnetic field sensors 338 that can detect the presence of an external magnetic field and communicate with the processor 332 to deactivate the crash sensor 336 and prevent inadvertent deployment of the airbag 132. In other embodiments, the electronic assembly 330 can include other sensors and/or additional features to aid in airbag deployment, and/or some of the components of the electronic assembly 330 may be omitted. In certain embodiments, for example, the electronic assembly can include only the power source 334 and the crash sensor 336, which completes a circuit to activate the inflator 328 in the event of a crash event. The various components of the electronic assembly 330 can be housed in a protective cover that can reduce the likelihood of damaging the components therein. During a crash event above a predetermined threshold, the crash sensor 336 can close one or more switches, thereby causing the processor 332 to send a corresponding signal to the deployment circuit 340. Upon receiving a signal from the processor 332, the deployment circuit 340 can apply a sufficient voltage to an igniter (e.g., a squib) that causes the inflator 328 to discharge its compressed gas into the airbag 132 via the gas delivery hose 124. The expansion of the compressed gas inflates the airbag 132 and causes it to deploy as described in greater detail below. The deployment and inflation system described above is provided by way of example of one such suitable system. It should be noted that the various embodiments of extending airbags described herein are not limited the particular deployment and inflation systems described above, but can be also be used with other types of deployment and inflations systems and, accordingly, are not limited to those described above.

Figure 4A:
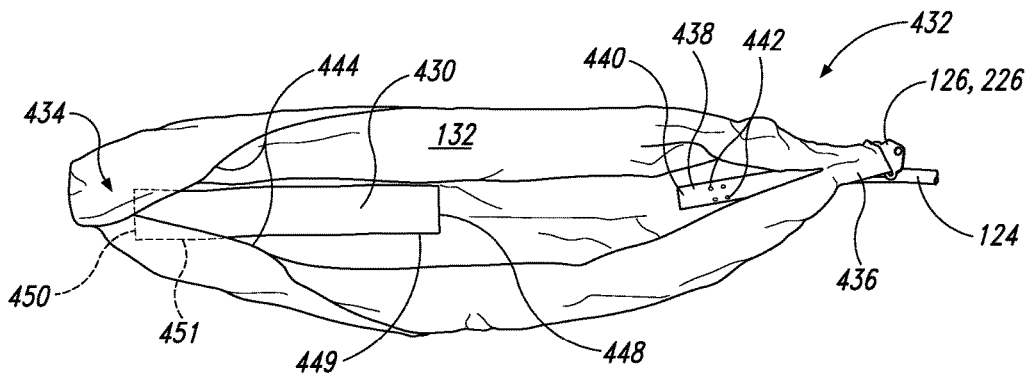
FIGS. 4A-4C are a series of views illustrating various features of an airbag in different stages of assembly, in accordance with an embodiment of the present technology.
Figure 4B:
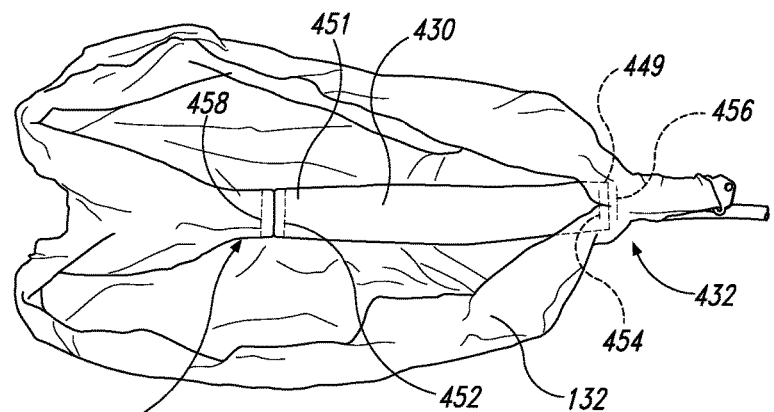
Figure 4C:
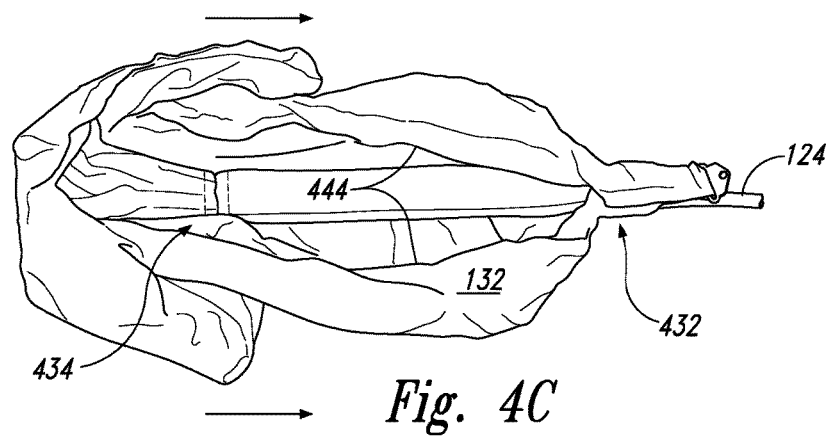

FIGS. 4A-4C show the airbag 132 in various stages of assembly in accordance with an embodiment of the present technology. Referring first to FIG. 4A, the airbag 132 is shown in a splayed-open configuration in which a longitudinal seam 444 is separated to illustrate an interior portion of the airbag 132. In the illustrated embodiment, the airbag 132 includes an upper or first end portion 432 and a lower or second end portion 434. The first end portion 432 includes a tab 436 of, e.g., airbag material that extends through an aperture in the fitting 126 (FIG. 1C), 226 (FIG. 2) and is folded back over onto itself and stitched together to form a loop of material that securely attaches the airbag 132 to the fitting 126, 226. The gas delivery hose 124 includes an end portion 438 that extends into the airbag 132 (via e.g., a slit in the airbag material near the first end portion 432) and is attached to the airbag material with stitching 440. The hose end portion 438 includes one or more openings or apertures 442 that enable pressurized gas from the inflator 328 (FIG. 3) to flow into and rapidly inflate the airbag 132.

The airbag 132 can additionally include a sheath 430 longitudinally disposed in an interior portion of the airbag 132 (the sheath 430 can also be referred to as a sleeve, channel, tunnel, tube, etc.). The sheath 430 can be generally similar in structure and function to the sheath 234 described above with reference to FIG. 2. For example, the sheath 430 can be formed from airbag material that is folded over to form an rectangular sleeve or passageway that is slightly larger in width than the shoulder belt portion 114b and had a first opening 448 positioned toward the first end portion 432 of the airbag 132, and a second opening 450 positioned toward the second end portion 434 of the airbag 132. In some embodiments, the sheath 430 can be made from airbag material (e.g., woven nylon material), or other suitable flexible and durable materials, such as other woven fiber materials, rubber materials, plastic materials, etc. Additionally, the sheath 430 can be sized so that it is as long, or at least approximately as long, as the airbag 132 when the airbag 132 is in the stowed configuration (as shown in, for example, FIG. 1A). As described above, the sheath 430 can form a tubular-like passageway through which the shoulder belt portion 114b can operably extend when the airbag 132 is stowed and installed.

Referring next to FIGS. 4A and 4B together, in the illustrated embodiment the sheath 430 can include a first tab 449 adjacent to the first opening 448, and a second tab 451 adjacent to the second opening 450. The first tab 449 is attached to the first end portion 432 of the airbag 132 via stitching 454 or other suitable means (e.g., adhesive), and the second tab 451 is attached to the second end portion 434 of the airbag 132 by stitching 452 or other suitable means. A first opening or slit 456 that can be, for example, approximately the width of the shoulder belt portion 114b, is formed in the airbag 132 adjacent to and aligned with the first opening 448 in the sheath 430. Similarly, a second opening or slit 458 is formed in the airbag 132 directly adjacent to and aligned with the second opening 450 in the sheath 430. Attaching the sheath 430 to the interior portion of the airbag 132 so that the sheath 430 extends from (or at least approximately from) the first opening 456 to the second opening 458 in the airbag 132 provides a central tunnel or passageway through the airbag 132 in which the shoulder belt portion 114b can operably slide back and forth during regular use.

To stow the airbag 132, the shoulder belt portion 114b (or other applicable web portion as the case may be) is extended though the sheath 430, and the airbag material extending from the second end portion 434 is folded back toward the first end portion 432 so that it overlays the airbag material extending from the first end portion 432 as shown in FIG. 4C. "Doubling-over" the airbag material and/or folding the airbag material back over itself in this way (e.g., see also FIG. 5A) can reduce the length of the stowed airbag 132 to approximately one-half (or less) of its original (unfolded) length. The airbag material is then wrapped around the sheath 430 to reduce the width of the stowed airbag, and the cover 122 (FIG. 1A) is fitted. Stowing the airbag 132 in this way enables the airbag 132 to extend as it inflates and deploys, as described below. The airbag attachment fitting 126, 226 can then be attached to the seat or vehicle structure as shown in, for example FIG. 1C or 2 to secure the airbag assembly 130 (FIG. 1A) in position. Stowing the airbag 132 in this manner provides a relatively short and compact package for mounting to the shoulder belt portion 114b. Although not shown in FIG. 4C for purposes of illustration, the seam 444 would of course be sewn shut upon completion of airbag assembly.

The airbag construction described above can provide a tubular airbag configuration that is not directly attached or connected to the seat belt webbing (e.g., the shoulder belt portion 114b) passing through the sheath 430. More specifically, in the illustrated embodiment, the sheath 430 forms or defines a channel through the center of the airbag 132 that the webbing can extend and retract through during normal use. This channel can be reinforced by the sheath 430, and/or an additional liner material within the sheath 430, so that the webbing moves freely without abrading the airbag material.

When installed on the occupant seat 102 (FIG. 1A), the first end portion of the airbag 432 is attached to the seat or vehicle structure by the tab 436, which is attached to the fitting 126 and (in this embodiment) is positioned below the channel formed by the sheath 430 (see, e.g., FIGS. 1C and 2).

Figure 5A:
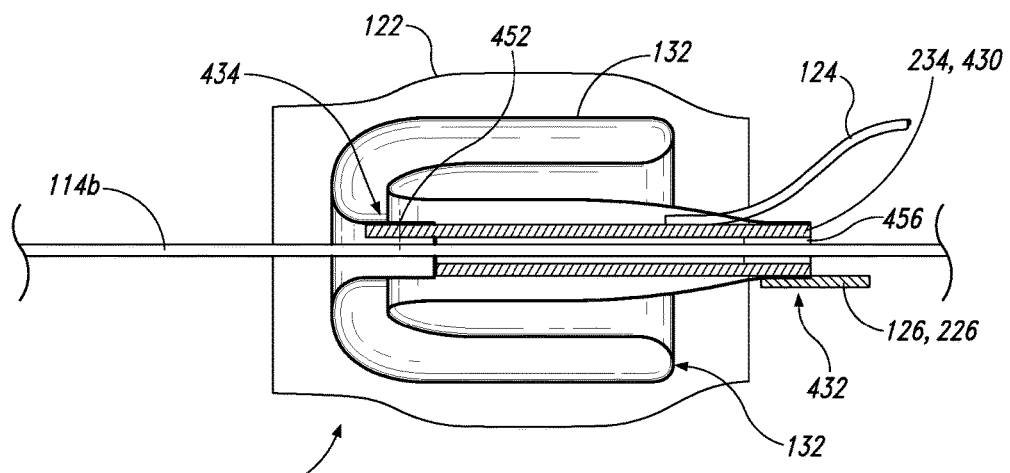
FIGS. 5A and 5B are cross-sectional side views of the airbag assembly of FIGS. 1A-1C illustrating the airbag in stowed and deployed configurations, respectively, in accordance with an embodiment of the present technology.
Figure 5B:
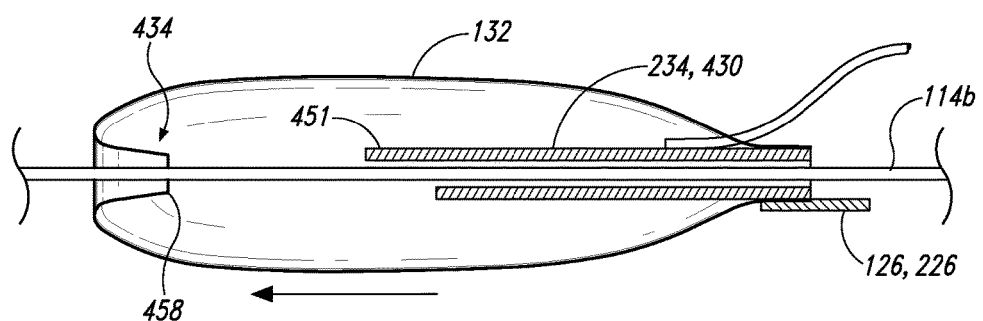

FIGS. 5A and 5B are partially schematic cross-sectional side views of the airbag assembly 130 illustrating operation of the airbag 132 during inflation in accordance with an embodiment of the present technology. FIG. 5A illustrates the airbag assembly 130 in the stowed configuration. As those of ordinary skill in the art will understand, however, the sidewalls of the airbag 132 are depicted as being spaced apart from each other in FIG. 5A for purposes of better illustrating the airbag configuration when stowed. In actual use, the material of the airbag 132 would be more tightly overlaid when stowed. Referring first to FIG. 5A, as described above the shoulder belt portion 114b extends through the airbag 132 (e.g., through a central portion of the airbag 132) by passing through the sheath 234, 430. This enables the shoulder belt portion 114b to slide or otherwise move back and forth through the airbag assembly 130 during normal use without changing the general position of the airbag assembly 130 relative to, for example, the occupant or seat.

During an accident event, the inflator 328 (FIG. 3) releases pressurized gas into the airbag 132 via the gas delivery hose 124. The pressurized gas initially causes the airbag 132 to expand generally radially, rupturing a seam on the cover 122 that is designed to fail at a predetermined pressure, thereby letting the airbag 132 deploy. The airbag 132 continues to inflate until the expansion of the airbag 132 rips or otherwise breaks the stitching 452 which attaches the second end portion 434 of the airbag 132 to the sheath 234, 430. Once this happens, the airbag 132 extends downwardly along the length of the shoulder belt portion 114b until the airbag is fully extended, as shown in FIG. 5B. In the illustrated embodiment, both the airbag 132 and the sheath 234, 430 are securely attached to the seat or vehicle structure via the attachment fitting 126, 226 and, as a result, the sheath 234, 430 and the first end portion 432 of the airbag 132 remain generally in place as the airbag 132 extends down the length of the shoulder belt portion 114b. In other embodiments, the second tab 451 of the sheath 234, 430 can remain attached to the second end portion 434 of the airbag 132 during deployment, and the opposite end portion of the sheath 234, 430 can be configured to detach from the airbag 132 during inflation and allow the airbag 132 to extend down the shoulder belt portion 114b.

In the embodiment of FIGS. 5A and 5B described above, the upper portion of the airbag assembly 130 is attached to the seat (or vehicle) structure so that the shoulder belt portion 114b can pass back and forth through the airbag assembly 130 in normal use. As noted above, however, in other embodiments the upper portion 432 of the airbag 132 can be fixedly attached to the shoulder belt portion 114b, and a sufficiently long section of shoulder belt web can extend from the lower portion 434 of the airbag 132 so that the shoulder belt portion 114b can be positioned around the seat occupant for use. (This length of web can be rolled up or otherwise stowed when not in use). In these other embodiments, the airbag 132 would still inflate and extend as described above in response to an accident event. That is, the airbag 132 would in general expand radially outward and then extend downwardly along the length of the shoulder belt portion 114b until the airbag is fully deployed, as shown in FIG. 5B. This embodiment can also be used with other web portions of occupant restraint systems. For example, this embodiment could be used with the lap belt portion 114a (FIG. 1A) by attaching the airbag 132 to the lap belt web proximate to the anchor point 116. Indeed, such embodiments may be particular useful for restraint web portions that have a fixed end portion (e.g., web portions that are not coupled to a web retractor). Accordingly, as the foregoing example illustrates, the extending airbag features of the present technology are not limited to use with pass-through airbag assemblies, and can also be used with airbag assemblies that are fixedly attached to occupant restraint system webs (and which may not be directly attached to a seat or vehicle structure).

Figure 6A:
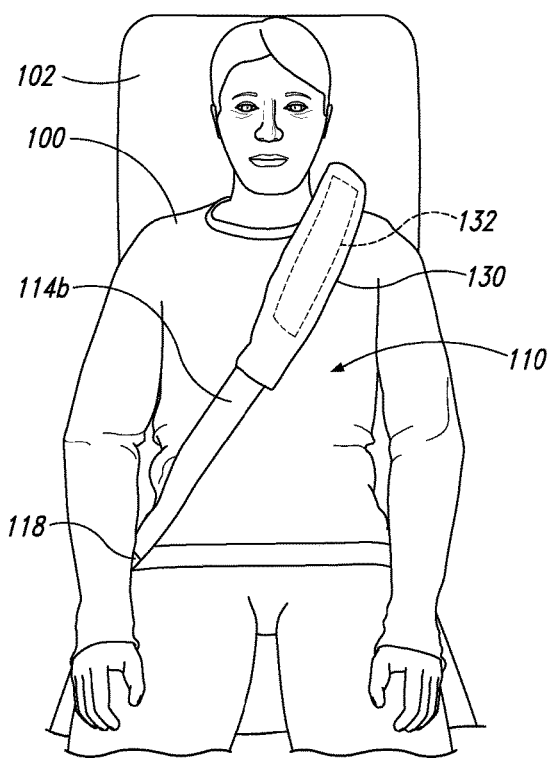
FIGS. 6A and 6B are front views of a vehicle occupant secured in a vehicle seat by the occupant restraint system of FIGS. 1A-1C before and after airbag deployment, respectively, in accordance with an embodiment of the present technology.
Figure 6B:
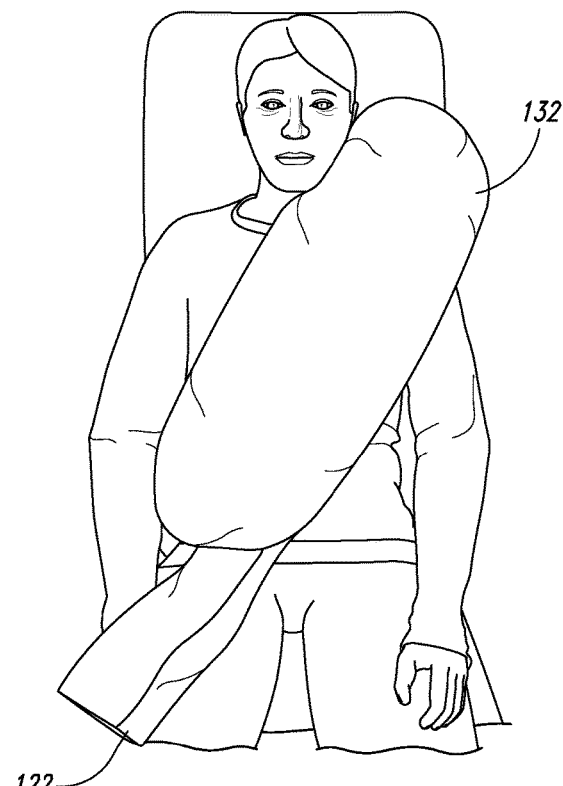

FIG. 6A is a front view of the occupant restraint system 110 prior to inflation of the airbag 132, and FIG. 6B is a corresponding view after inflation of the airbag 132. Referring to FIGS. 6A and 6B together, prior to an accident event the airbag assembly 130 is positioned generally over the shoulder of the occupant 100 and extending downwardly across an upper portion of the occupant's chest. Should the occupant 100 wish to release the restraint system 110 and get out of his or her seat, the shoulder belt portion 114b would be free to retract through the airbag assembly 130 while the airbag assembly 130 remained in its general position in the region proximate or near to the upper portion of the seat 102. In response to an accident event or other dynamic event above a predetermined threshold or magnitude, the airbag 132 is inflated as described above and extends from the occupant's shoulder and chest area downwardly toward the buckle tongue 118 at the occupant's waist to protect the occupant from, e.g., injury to the head and/or torso. As can be appreciated, embodiments of the airbag assembly 130 provide a relatively compact airbag when stowed, yet can inflate upon detection of an accident event and extend across the entire front torso of the occupant, or at least most of the front torso, to provide occupant protection.

Figure 7A:
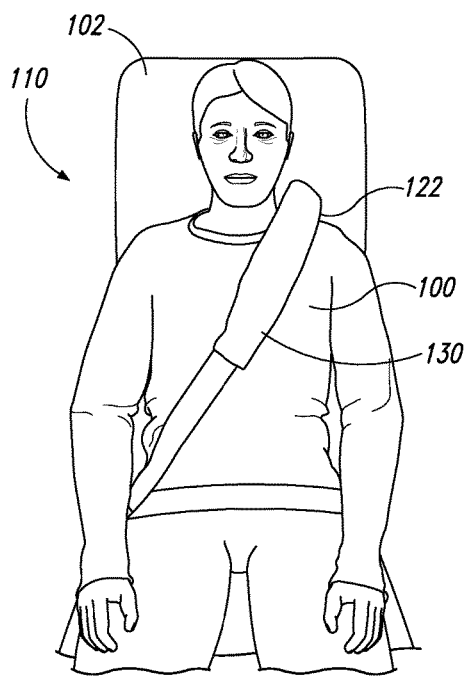
FIGS. 7A-7E are a series of time-sequenced front views of a vehicle occupant secured in a vehicle seat by the occupant restraint system of FIGS. 1A-1C at various stages of airbag deployment in accordance with an embodiment of the present technology.
Figure 7B:
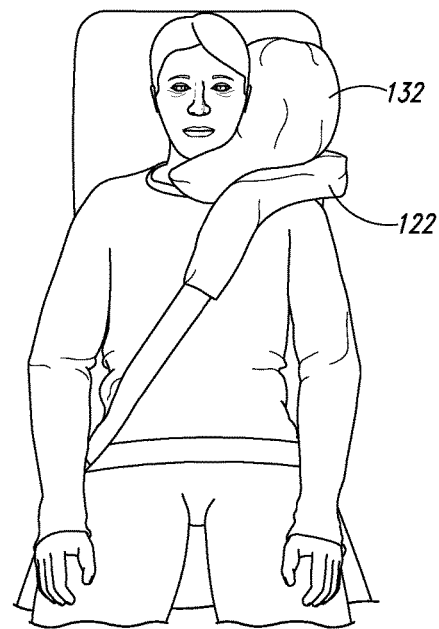
Figure 7C:
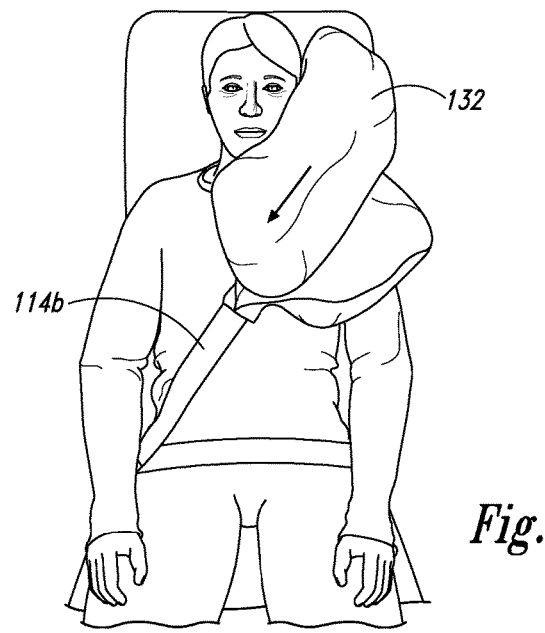
Figure 7D:
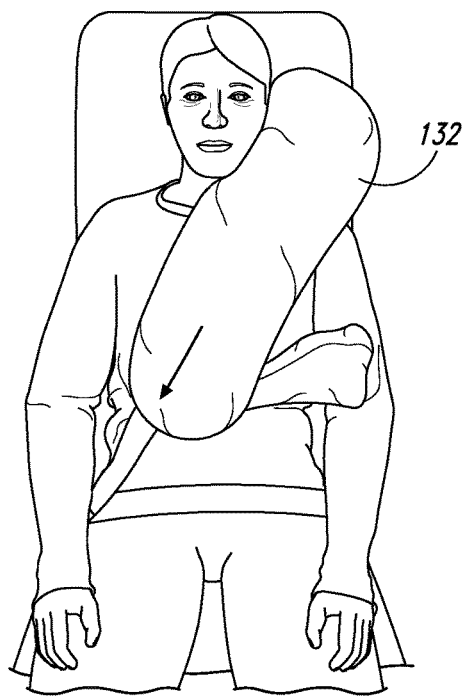
Figure 7E:
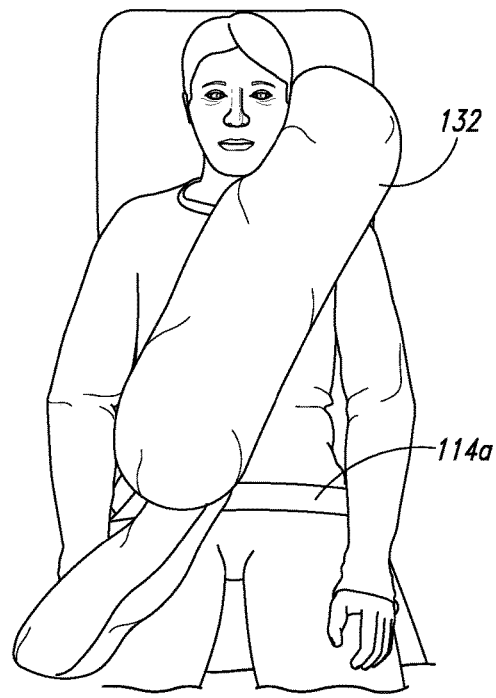

FIGS. 7A-7E are series of front views of the restraint system 110 illustrating time-sequence inflation of the airbag 132 in accordance with an embodiment of the present technology. Referring first to FIG. 7A, the occupant 100 is seated in the vehicle seat 102 (e.g., a forward-, rearward-, side-, or oblique-facing seat) and has put on the restraint system 110 as described above with reference to FIG. 1A. In FIG. 7B, the airbag 132 has displaced the cover 122 and begun to deploy in response to an accident event. As shown in FIG. 7C, as the airbag 132 continues to rapidly inflate, it expands generally radially outward (e.g., transverse to the shoulder belt portion 114b) from its stowed position. Then the airbag 132 begins to unfurl and extend downwardly along the length of the shoulder belt portion 114b as it continues to inflate, as shown in FIG. 7D. As shown on FIG. 7E, when the airbag 132 is fully inflated, the lower or second end portion 434 is positioned proximate or near (e.g., directly adjacent to), the lap belt portion 114a. In this configuration, embodiments of the airbag 132 can offer protection to the occupant 100 from head and/or torso impact injury. As these figures illustrate, in some embodiments the airbag 132 can have a generally cylindrical cross-section (e.g., a generally circular cross-section) and can extend for the entire length of the shoulder belt portion 114b, or for at least approximately the entire length (e.g., about 75-95% of the entire length) of the shoulder belt portion 114b when deployed.

Although the airbag assembly 130 described above includes an extending airbag 132 that extends longitudinally along the corresponding web portion when inflated, in other embodiments pass-through airbag assemblies configured in accordance with the present technology can include airbags that do not extend (or at least do not extend substantially) along the length of the web the airbag is mounted to when inflated. As those of ordinary skill in the art will appreciate, such pass-through airbag assemblies can include an internal sheath (e.g., a sheath similar to the sheath 234 and or 430 described above) that extends through the interior (e.g. a center portion) of the airbag to provide a channel or tunnel through which the web (e.g., a shoulder belt) can pass. Such airbag assemblies can be attached to seat or vehicle structures, and be initiated/inflated, as described above for the airbag assembly 130. In contrast to the extending airbag 132 described above, however, such "non-extending" airbags are not foreshortened when stowed as described above.

Figure 8A:
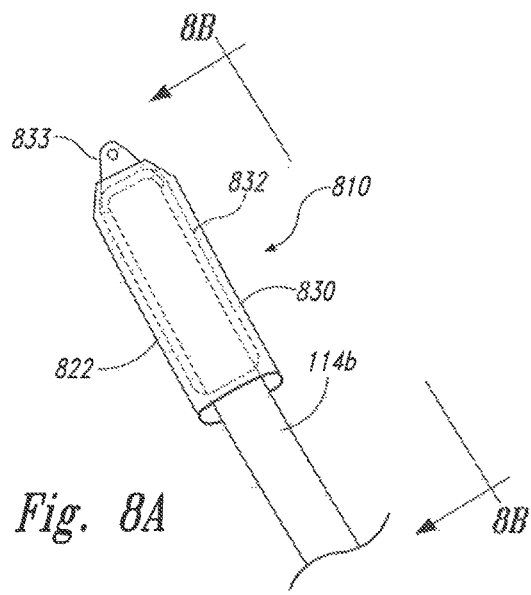
FIG. 8A is a front view of a portion of an occupant restraint system having an airbag assembly configured in accordance with another embodiment of the present technology.
Figure 8B:
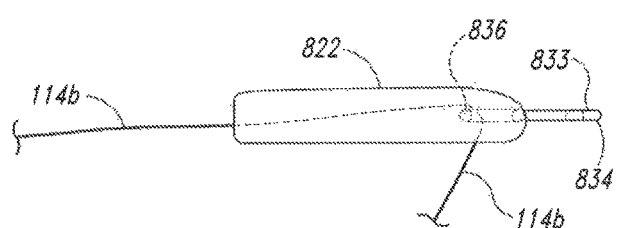
FIG. 8B is a side view taken substantially along line 8B-8B in FIG. 8A.

FIG. 8A is a front view of a portion of a restraint system 810 having an airbag assembly 830 configured in accordance with another embodiment of the present technology, and FIG. 8B is a side view of the airbag assembly 830 shown in FIG. 8A. Referring to FIGS. 8A and 8B together, the features and components of the airbag assembly 830 are at least generally similar in structure and function to the airbag assembly 130 described in detail above. For example, the airbag assembly 830 includes a cover 822 that encloses an extending, pass-through airbag 832 that is at least generally similar in structure and function to the airbag 132 described in detail above. In the illustrated embodiment of FIGS. 8A and 8B, however, a single fitting 833 is used to attach the upper portion of the airbag 832 to the seat structure, and to provide a guide for the shoulder belt portion 114b. In contrast, the embodiment of, for example, FIG. 2 described above uses the fitting 226 to attach the airbag 132 to the seat structure, and a separate D-ring 232 to provide a guide for the shoulder belt portion 114b.

Figure 9A:
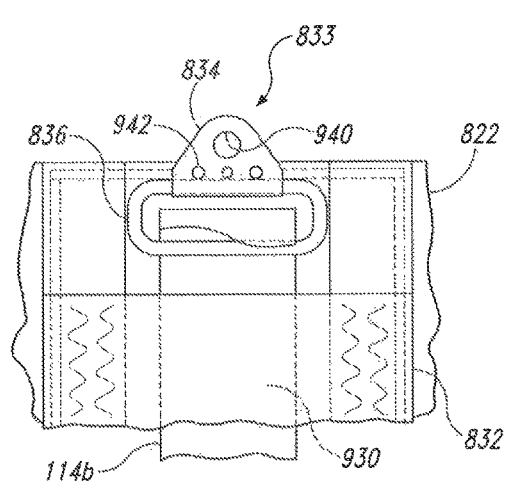
FIG. 9A is an enlarged bottom view.
Figure 9B:
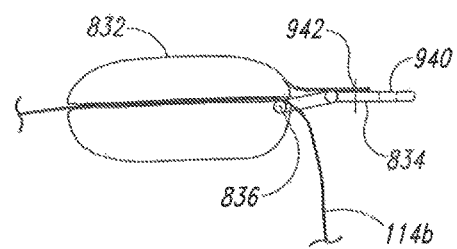
FIG. 9B is a side view, of a portion of the airbag assembly of FIGS. 8A and 8B illustrating features for attaching the airbag assembly to an adjacent seat or vehicle structure in accordance with another embodiment the present technology.

FIG. 9 is an enlarged view of an upper portion of the airbag assembly 830 illustrating various features associated with the fitting 833 in more detail. In the illustrated embodiment, the fitting 833 includes a D-ring 836 rotatably or pivotally attached to a bracket 834. The bracket 834 can include an aperture 940 that can receive a bolt or other suitable fastener for fixedly attaching the bracket 834 to a seat or vehicle structure adjacent to an upper portion of the aircraft seat where the shoulder belt portion 114b would normally pass over the shoulder of the seat occupant. As with the airbag assembly 130 described above, the airbag assembly 830 can include an inner sheath 930 which enables the shoulder belt portion 114b to slide back and forth within the airbag assembly 830. In this embodiment, upper portions of both the sheath 930 and the airbag 832 can be attached to the bracket 834 with rivets or other suitable fastening means 942. The airbag cover 822 can provide a suitable opening for the D-ring 836 to extend outwardly and/or move freely relative to the airbag assembly 830. In use, the shoulder belt portion 114b extends through the center portion of the airbag assembly 830 via the sheath 930, and then passes around the D-ring 836 and extends downwardly from there to, for example, a web retractor (e.g., the retractor 326 shown in FIG. 3). As noted above, one advantage of this configuration is that a single fitting (e.g., the attachment fitting 833) can be used to attach the airbag 832 to the adjacent seat or vehicles structure, and that at the same time provide a guide member (e.g., the D-ring 836) for the shoulder belt portion 114b.

Figure 10A:
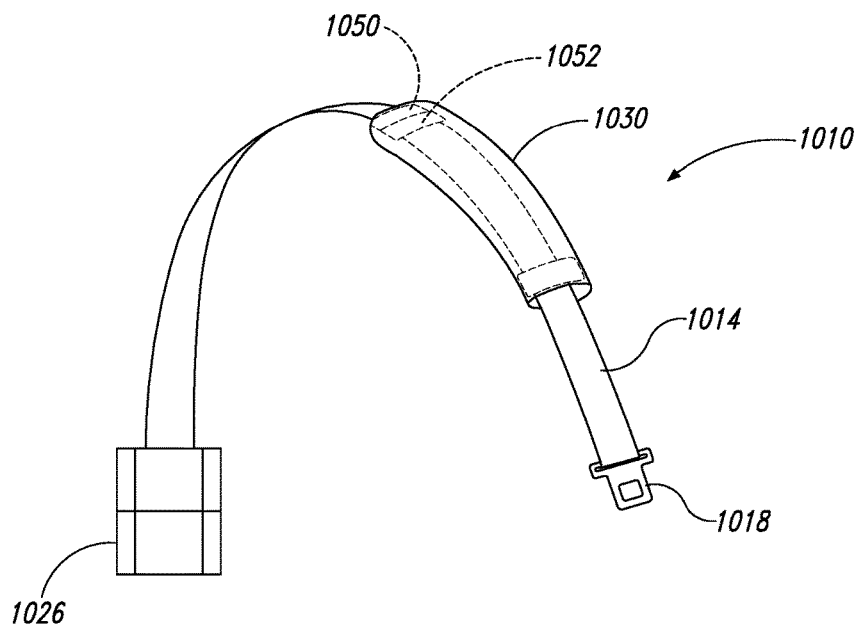
FIG. 10A is an isometric view of an occupant restraint system having an airbag assembly mounted to a web in accordance with another embodiment of the present technology.
Figure 10B:
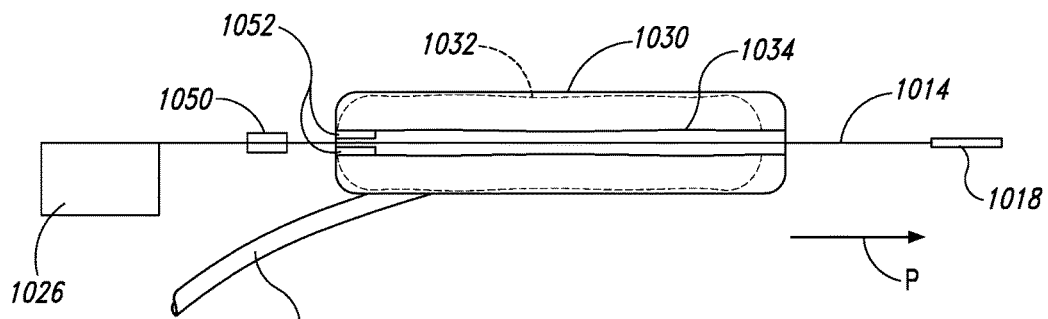
FIG. 10B is a side view of the restraint system of FIG. 10A.

FIG. 10A is an isometric view of a portion of an occupant restraint system 1010 configured in accordance with another embodiment of the present technology, and FIG. 10B is a side view of the restraint system 1010. Referring to FIGS. 10A and 10B together, the components and features of the restraint system 1010 can be at least generally in structure and function to the corresponding components and features of the occupant restraint system 110 described in detail above with reference to FIGS. 1A-1C. For example, the restraint system 1010 includes an airbag assembly 1030 operably mounted to a shoulder belt portion 1014. A distal end of the shoulder belt portion 1014 can carry a buckle tongue 1018 for releasable engagement with a corresponding buckle. The opposite end of the shoulder belt portion 1014 can be received by a suitable seat belt web retractor 1026, which can be mounted to a vehicle seat structure behind the seat or to an adjacent vehicle structure (not shown). Although only the shoulder web portion 1014 is illustrated in FIGS. 10A and 10B, it is understood that the restraint system 1010 can also include a lap belt portion that is at least generally similar in structure and function to the lap belt portion 114a described above with reference to FIG. 1A.

The components and features of the airbag assembly 1030 are at least generally similar in structure and function to the corresponding components and features of the airbag assembly 130 described in detail above with reference to FIGS. 1A-7G. For example, the airbag assembly 1030 includes a sheath 1034 that forms a channel or passageway through an airbag 1032. In this particular embodiment, however, neither the sheath 1034 nor the airbag 1032 is directly secured to an upper portion of the seat or the adjacent seat structure by, for example, a fitting like the fitting 126 (FIG. 1C). Instead, a web stop 1050 (e.g., a raised lip structure) is attached to the shoulder belt portion 1014 between the airbag assembly 1030 and the retractor 1026, and a collar or catch 1052 is attached to the mouth of the airbag assembly 1030 where the shoulder belt portion 1014 enters the sheath 1034. A gas delivery hose 1024 and/or the retracted buckle tongue 1018 holds the airbag assembly 1030 in its general position toward the upper portion of the seat back (not shown) until the shoulder belt portion 1014 is pulled down into position by the seat occupant. When the seat occupant draws the shoulder belt portion 1014 across his or her chest to insert the buckle tongue 1018 in the buckle, the shoulder belt portion 1014 will slide through the airbag assembly 1030 until the web stop 1050 contacts the catch 1052 and pulls the airbag assembly 1030 into position. Accordingly, in this embodiment, a separate fitting is not required for attaching the airbag assembly 1030 to the adjacent seat or vehicle structure.

Figure 11:
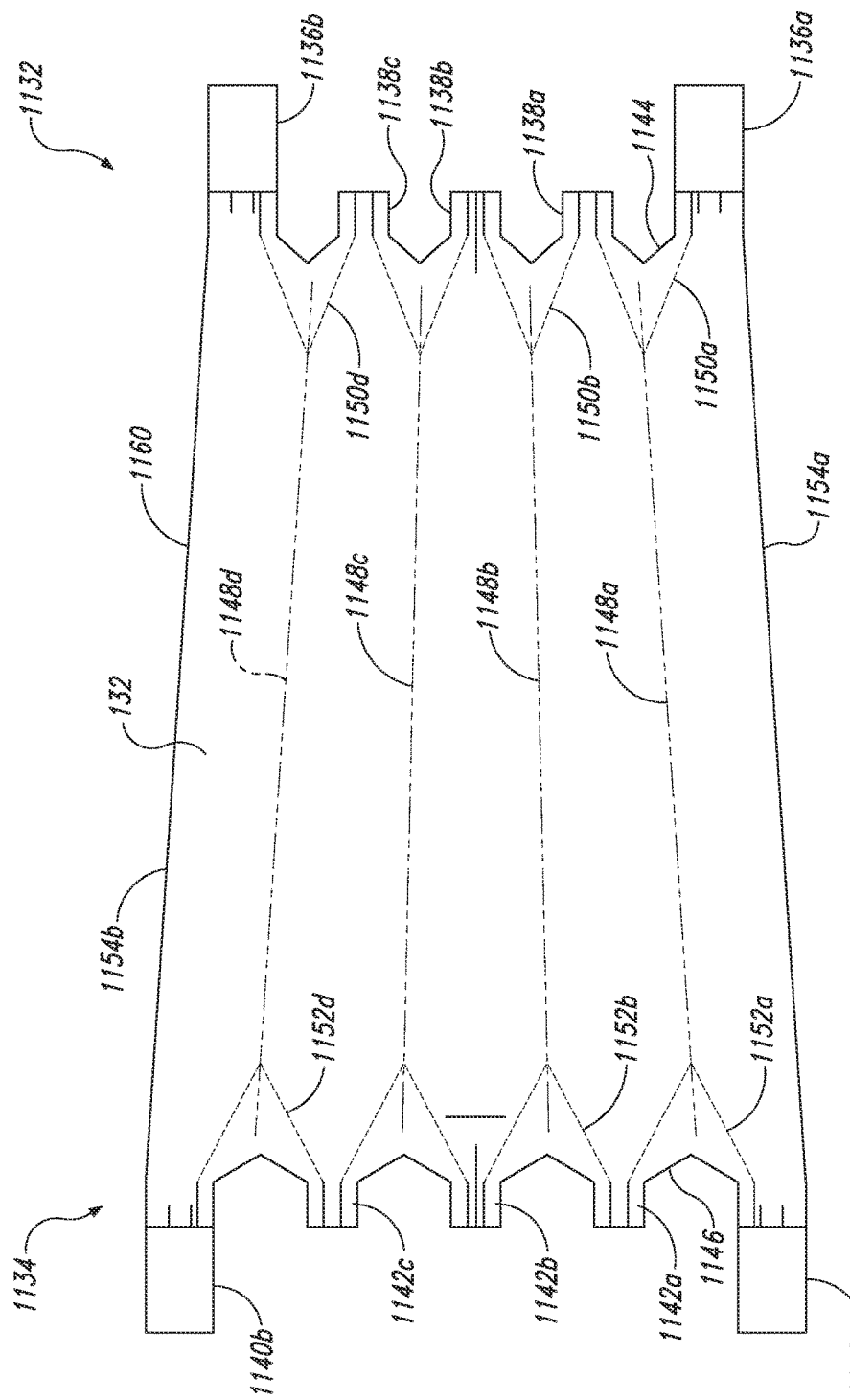
FIG. 11 is a plan view of a flat pattern for making an airbag configured in accordance with an embodiment of the present technology.

FIG. 11 illustrates a flat pattern 1060 that can be used to make the airbag 132 described above in accordance with an embodiment of the present technology. The flat pattern 1160 can be cut from a piece of suitable airbag material, such as woven nylon material or other suitable airbag materials well known in the art. In the illustrated embodiment, the flat pattern 1160 has a slightly tapered rectangular shape with a first end portion 1132 spaced apart from the second end portion 1134. The first end portion of 1132 includes first and second outer tabs 1136a and 1136b, and the second end portion 1134 similarly includes corresponding first and second outer tabs 1140a and 1140b. Additionally, the first end portion 1132 includes a plurality of (e.g., 3) inner tabs 1138a-1138c, and the second end portion 1134 includes a plurality of corresponding inner tabs 1142a-1142c. A plurality of cutouts or pleats 1144 are alternatingly positioned between the tabs 1136 and 1138, and similar cutouts for pleats 1146 or positioned between the tabs 1140 and 1142.

The airbag 132 can be formed from the flat pattern 1160 in one embodiment as follows: First, the flat pattern 1160 is folded about a first fold line 1148a extending between opposing apexes of the pleats 1144 and 1146. The overlaid airbag material resulting from the first fold is then stitched together along a first stitch line 1150a and a second stitch line 1152a. The airbag material is then folded about a second fold line 1148b, and the overlaid material is stitched along a first stitch line 1150b and a second stitch line 1152b. Next, the flat pattern 1160 is folded about a third fold line 1148c, stitched as described above, and then folded again about a fourth fold line 1148d, and stitched as described above. The outer tabs 1136a and 1136b can then be stitched together, and the opposite outer tabs 1140a and 1140b can also be stitched together. The sewn-together tabs 1136 can, for example, be used to attach the airbag 132 to the seat or vehicle structure upon installation. After a web sheath (e.g., the sheath 430) and/or a gas delivery hose (e.g., the hose 124) are stitched or otherwise appropriately attached to the interior portion of the airbag 132, outer edges 1154a and 1154b can be stitched together to form the basic structure of the airbag 132.

Figure 12A:
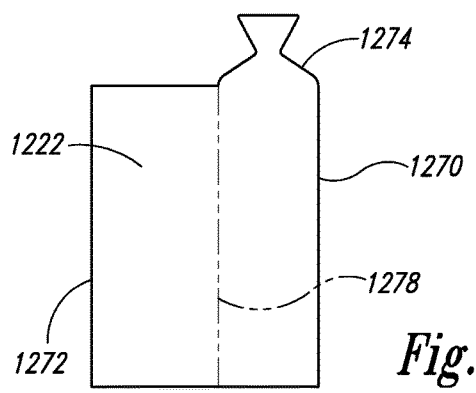
FIGS. 12A-12C are a series of plan, assembly, and installation views, respectively, of an airbag cover for use with airbag systems configured in accordance with the present technology.
Figure 12B:
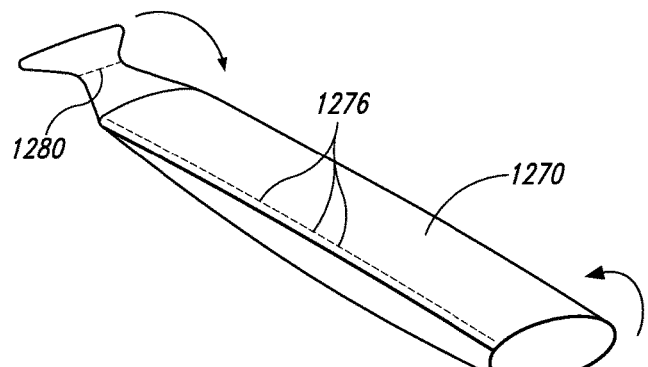
Figure 12C:
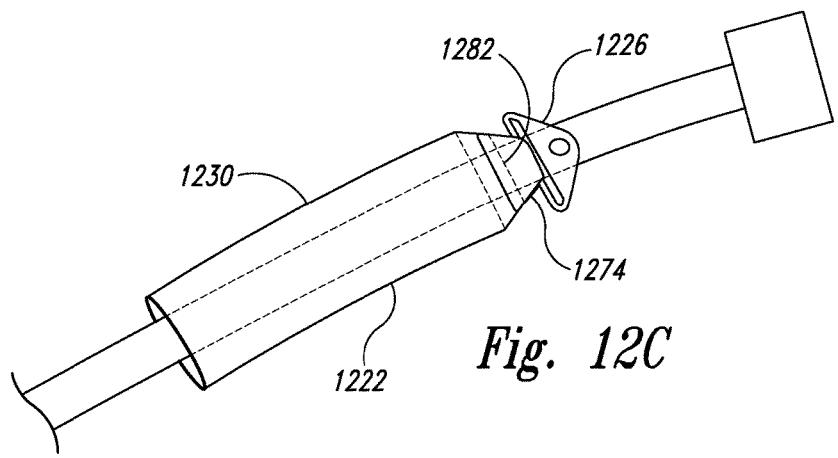

FIG. 12A illustrates a flat pattern 1270 for an airbag cover, such as the airbag cover 122 of FIG. 1A, configured in accordance with an embodiment of the present technology. FIG. 12B is an isometric view illustrating assembly of the airbag cover 122 from the flat pattern 1270, and FIG. 12C is a front view of a portion of a restraint system 1210 depicting the cover 1222 installed on an airbag assembly 1230. Referring first to FIG. 12A, the airbag cover flat pattern 1270 can be made from a durable vinyl or other suitable airbag cover from materials known in the art. In this embodiment, the flat pattern 1270 includes a generally rectangular body portion 1272 and a tab portion 1274 extending outwardly therefrom. Referring to FIGS. 12A and 12B together, to assemble the airbag cover 1222, the flat pattern 1270 is first folded about a fold line 1278. The overlapping edge portions of the flat pattern 1270 can then be fastened together with suitable stitching 1276, adhesive, etc., which is configured to rupture as the airbag inflates, allowing the airbag to rapidly deploy. Referring next to FIG. 12C, to attach the airbag cover 1222 to an attachment fitting 1226 for mounting to a seat or vehicle structure, the tab 1274 can be inserted through an opening in the fitting and folded about a fold line 1280 (FIG. 12B), and then fastened to itself via stitching 1282 or other suitable means of fastening to form a loop.

Figure 13A:
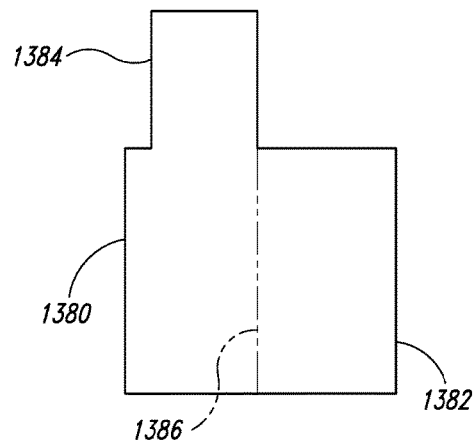
FIG. 13A is a plan view of a flat pattern of a seat belt sheath for use with an airbag configured in accordance with an embodiment of the present technology.
Figure 13B:
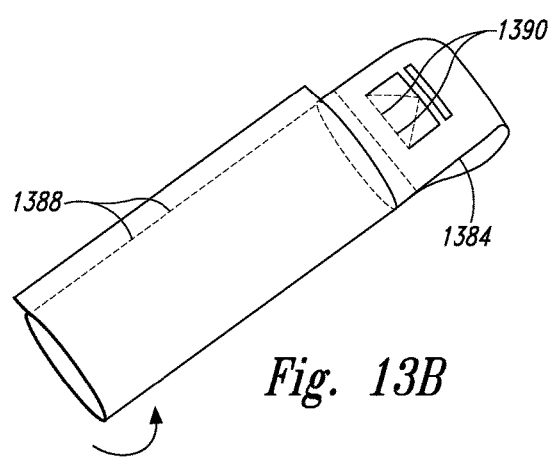
FIG. 13B is an isometric view illustrating assembly of the sheath.

FIG. 13A illustrates a flat pattern 1380 of an airbag cover 1322 configured in accordance with another embodiment of the present technology, and FIG. 13B is an isometric view illustrating assembly of the airbag cover 1322. Referring first to FIG. 13A, the flat pattern 1380 can include a generally rectangular body portion 1382 and a smaller rectangular tab portion 1384 extending therefrom. Referring to FIG. 13B, to assemble the cover 1322, the flat pattern 1380 is folded about a fold line 1386 (FIG. 13A) and the outer edges of the body portion 1382 are fastened together via stitches 1388 or other suitable fastening means. The tab 1384 can be folded over and fastened to itself with stitching 1390 to create a loop of material for attaching the cover 1322 to a suitable attachment fitting. Although the flat pattern 1380 can be used to make an airbag cover, a similar flat pattern can also be used to form an airbag sheath, such as the sheath 234 (FIG. 2) or the sheath 430 (FIG. 4A) described in detail above.

Figure 13C:
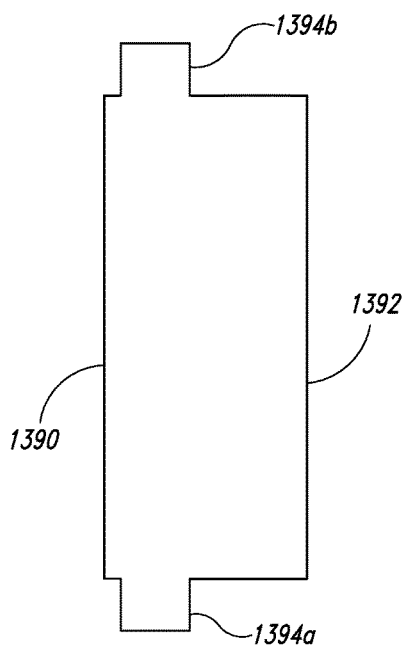
FIG. 13C is a plan view of a flat pattern of a seat belt sheath configured in accordance with another embodiment of the present technology.

FIG. 13C illustrates a flat pattern 1390 of material that can be used to form an airbag sheath (e.g., the sheath 430 described above with reference to FIGS. 4A-4C) for use with a pass-through, extending airbag as described above. In the illustrated embodiment, the flat pattern 1390 includes a generally rectangular body portion 1392 with opposing rectangular tabs 1394a and 1394b extending outwardly from opposite ends thereof. The body portion 1392 can be sized to accommodate a typical seat belt web when folded over and the outer edges are fastened together with stitching, adhesive, or other suitable means. The tabs 1394 can be secured to opposite end portions of the corresponding airbag material as described above with reference, for example, FIGS. 4A-4C. Alternatively, one or both of the tabs 1394 can also be folded over themselves and fastened together to form a material loop as needed for attachment to a seat or vehicle structure.

Figure 14:
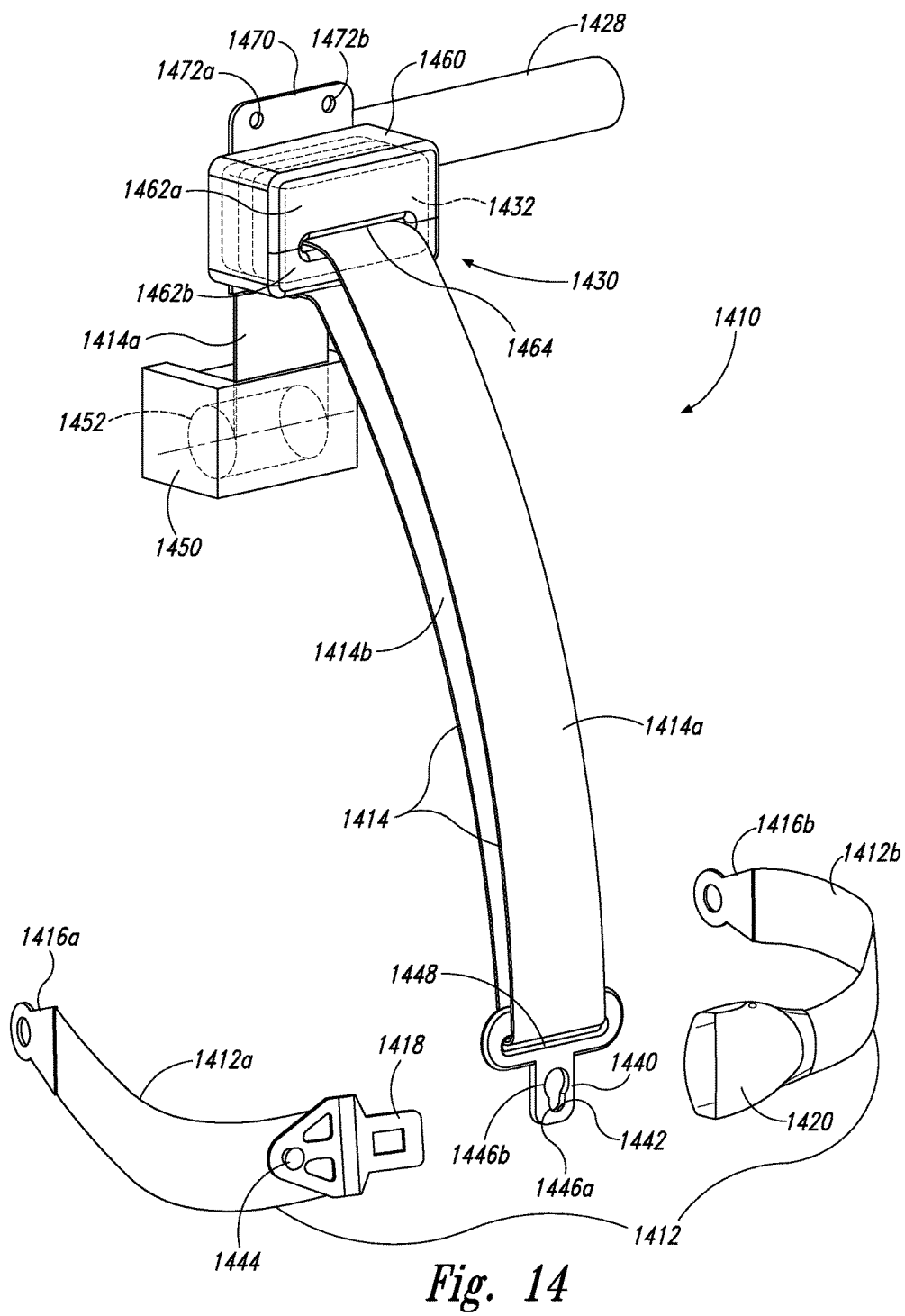
FIG. 14 is a front isometric view of a vehicle occupant restraint system having an airbag assembly configured in accordance with another embodiment of the present technology.

FIG. 14 is a front isometric view of an occupant restraint system 1410 having an airbag assembly 1430 configured in accordance with another embodiment of the present technology. In the illustrated embodiment, the restraint system 1410 is a three-point restraint system having a lap belt 1412 configured to extend around the waist of a seat occupant (not shown), and a shoulder belt 1414 configured to extend across the occupant's torso from the lap belt 1412 to a housing 1460 positioned adjacent to (e.g., slightly above) the occupant's opposite shoulder. The lap belt 1412 can include a first lap belt portion 1412a and a second lap belt portion 1412b. (The first lap belt portion 1412a and the second lap belt portion 1412b can also be referred to as a first lap "web" portion 1412a and a second lap "web" portion 1412b, respectively). The first lap belt portion 1412a has a lap belt connector 1418 attached to one end, and a first attachment fitting 1416a attached to the other end for attachment to the vehicle seat or to an adjacent vehicle structure on one side of the seat. The second lap belt portion 1412b has a second attachment fitting 1416b attached to one end for attachment to the vehicle seat or an adjacent vehicle structure on the other side of the seat, and a buckle 1420 attached to the other end for receiving and releasably engaging a tongue portion of the lap belt connector 1418. The buckle 1420 and the lap web connector 1418 can be at least generally similar in structure and function to conventional seat belt connectors and buckles that can be securely engaged and released by seat occupants in a well-known manner.

In the illustrated embodiment, the shoulder belt 1414 slidably extends through a web aperture 1448 in a shoulder belt connector 1440 to divide the shoulder belt 1414 into a first shoulder belt portion 1414a and a second shoulder belt portion 1414b, such that the first shoulder belt portion 1414a overlays the second shoulder belt portion 1414b and, accordingly, the second shoulder belt portion 1414b extends underneath the first shoulder belt portion 1414a. (The first shoulder belt portion 1414a and the second shoulder belt portion 1414b can also be referred to as a first shoulder "web" portion 1414a and a second shoulder "web" portion 1414b, respectively). The shoulder belt connector 1440 can include a tongue portion having an engagement aperture 1442. In some embodiments, the engagement aperture 1442 can have a generally "FIG. 8" shape in which a lower portion 1446a is smaller in width than an upper portion 1446b. As described in greater detail below, the engagement aperture 1442 is configured to receive and engage a post 1444 extending outwardly from the lap belt connector 1418 to releasably attach the shoulder belt 1414 to the lap belt 1412.

When a seat occupant wishes to put on the restraint 1410, he or she can do so by first engaging the lap belt connector 1418 with the buckle 1420 in a known manner. Next, the occupant can grasp the shoulder belt connector 1440 and position it over the lap belt connector 1418 so that the post 1444 extends through the upper portion 1446b of the engagement aperture 1442. Once this is done, the occupant can then slide the shoulder belt connector 1440 upwardly so that the shaft of the post 1444 moves into the lower portion 1446a of the engagement aperture 1442. In the illustrated embodiment, the post 1444 includes a head that is larger than the shaft. As a result, the head retains the shoulder belt connector 1140 in engagement with the lap belt connector 1418 as long as the post 1444 extends through the lower portion 1446a of the aperture 1442.

In another aspect of this embodiment, the airbag assembly 1430 includes an airbag 1432 stowed in the housing 1460. More specifically, the airbag 1432 is folded and/or otherwise compacted so that it fits neatly in the housing 1460. The housing 1460 can include panels or doors 1462 (identified individually as a first door 1462a and a second door 1462b) that are configured to open or otherwise be displaced outwardly upon inflation of the airbag 1432 to permit the airbag 1432 to expand and extend along a length of the first shoulder belt portion 1414a, as described in greater detail below. The housing 1460 is attached to a mounting bracket 1470. The mounting bracket 1470 can include a plurality of mounting holes 1472 (identified individually as a first mounting hole 1472a and a second mounting hole 1472b) that can receive suitable fasteners (e.g., screws, bolts, etc.) for fixedly attaching the mounting bracket 1470 to, e.g., the seat structure or an adjacent vehicle structure. In a further aspect of this embodiment, an inflator 1428 is attached to the mounting bracket 1470 behind the housing 1460. As described in greater detail below, the inflator 1428 is configured to rapidly release pressurized gas (e.g., air) into the airbag 1432 when the vehicle experiences a dynamic event (e.g., a collision) above a preset magnitude.

In the illustrated embodiment, an end portion of the second shoulder belt portion 1414b is securely attached to a lower portion of the mounting bracket 1470 beneath the housing 1460. The opposite end portion of the first shoulder belt portion 1414a extends through a first web aperture 1464 in the housing 1460, the stowed airbag 1432, and the mounting bracket 1470, and is attached to a rotatable spool 1452 in a web retractor 1450. The web retractor 1450 can be at least generally similar in structure and function to conventional seat belt retractors well known to those of ordinary skill in the art, and can be mounted to a rear portion of the vehicle seat (not shown), or an adjacent vehicle structure behind the seat. As is known, the spool 1452 can be spring-loaded, or otherwise driven to provide a tension load on the first shoulder belt portion 1414a and to retract the shoulder belt portion 1414a when not in use. As is also known, the belt retractor 1450 can also include one or more suitable locking features that lock the spool 1452 and prevent the first shoulder belt portion 1414a from paying out or otherwise extending if the vehicle experiences a dynamic event (e.g., a crash or other rapid deceleration) above a preset magnitude or a threshold. Locking the shoulder belt 1414 in this manner restrains the occupant in the seat and can prevent or at least greatly reduce the likelihood that the occupant will sustain injury from a forward strike hazard. Although the retractor 1450 is operably coupled to the first shoulder belt portion 1414a in this embodiment, in other embodiments the retractor 1450 can be operably coupled to the second shoulder belt portion 1414b and the opposite end of the first shoulder belt portion 1414a can be fixedly attached to the bracket 1470. In such embodiments, the retracting portion of the shoulder belt 1414 (i.e., the second shoulder belt portion 1414b) would be positioned against the occupant.

Figure 15A:
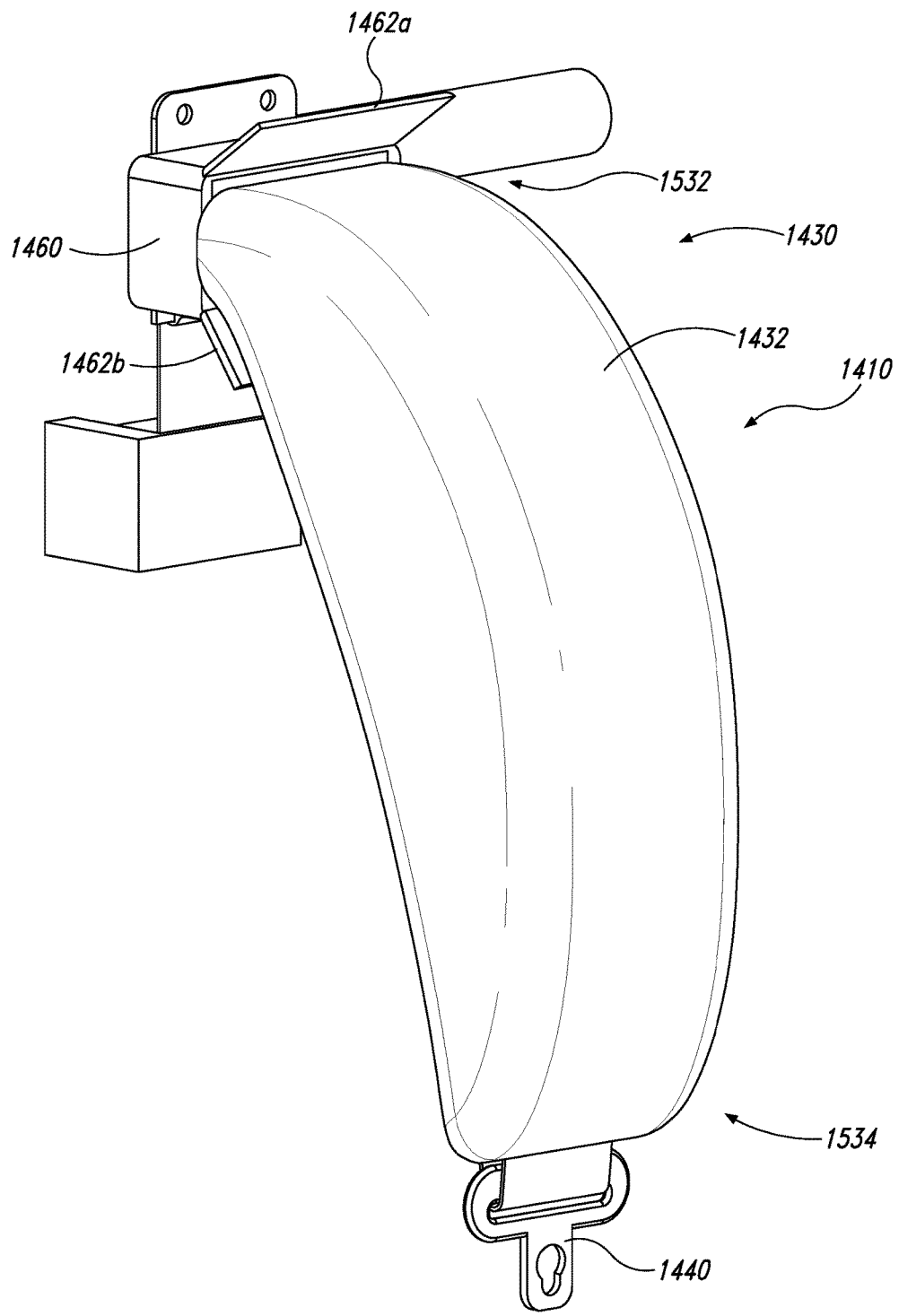
FIGS. 15A and 15B are front isometric and side views, respectively, of the occupant restraint system of FIG. 14 illustrating the airbag after deployment, in accordance with an embodiment of the present technology.
Figure 15B:
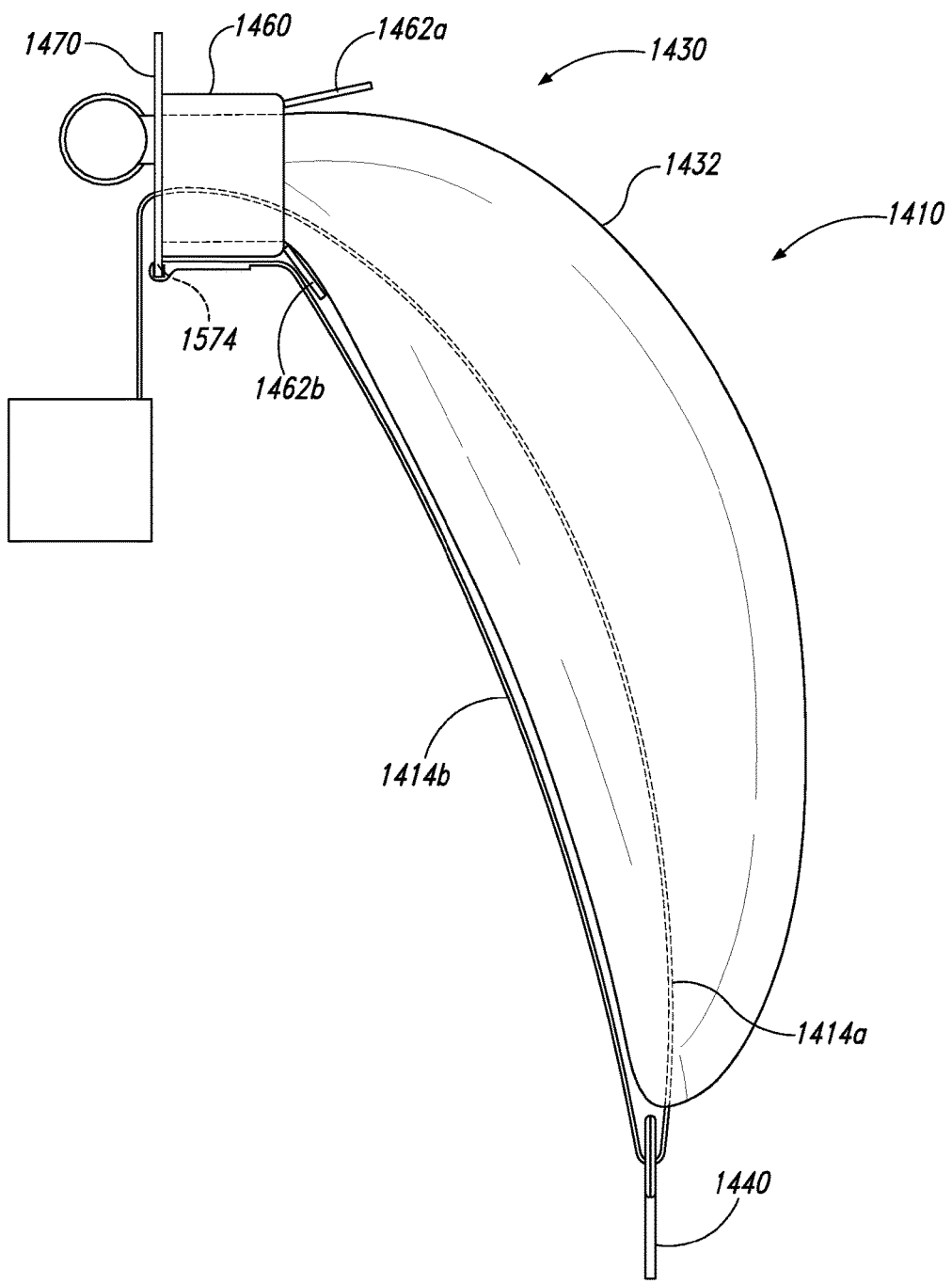

FIG. 15A is a front isometric view, and FIG. 15B is a corresponding side view, of the airbag assembly 1430 after the airbag 1432 has inflated and deployed from the housing

1460. The lap belt 1412 is omitted from FIGS. 15A and 15B for purposes of illustration. Referring to FIGS. 15A and 15B together, when the airbag 1432 inflates, it displaces the doors 1462a, b so that the airbag 1432 can deploy through an opening in the housing 1460 and extend generally downwardly along the length of the first shoulder belt portion 1414a. More specifically, when fully inflated the airbag 1432 extends from an upper or first end portion 1532 proximate the housing 1460 to a second or lower end portion proximate, or at least relatively close, to the shoulder belt connector 1440. Additionally, as illustrated in FIG. 15B, the first shoulder belt portion 1414a extends through an interior portion of the inflated airbag 1432, such that when the airbag 1432 inflates, it extends downwardly around the first shoulder belt portion 1414a. Conversely, the second shoulder belt portion 1414b extends on the outside of the inflated airbag 1432 generally beneath the first shoulder belt portion 1414a, and is fixedly attached to a web aperture 1574 in a lower portion of the mounting bracket 1470. In some embodiments, it has been found that by having the second belt portion 1414b (i.e., the return loop of the shoulder belt 1414) extend between the occupant and the airbag 1432, the second shoulder belt portion 1414b can provide a surface for the airbag 1432 to slide against as it deploys along the length of the first belt portion 1414a, thereby preventing the airbag 1432 from being caught on the occupant and/or a portion of the occupant's clothing during inflation and deployment. This feature of the illustrated embodiment can facilitate relatively smooth and consistent deployment of the airbag 1432.

Figure 16A:
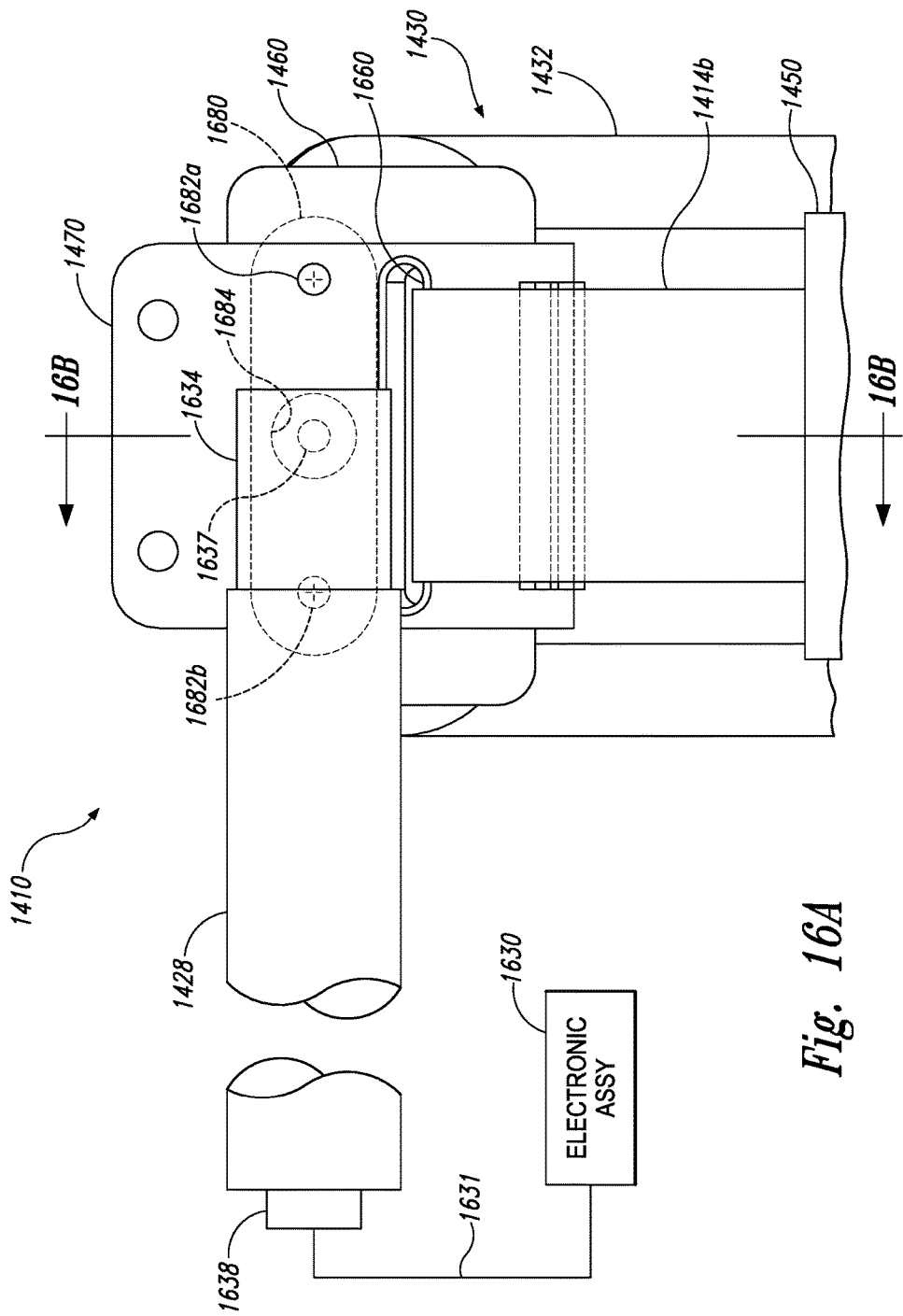
FIG. 16A is an enlarged rear view of a portion of the occupant restraint system of FIGS. 14-15B.
Figure 16B:
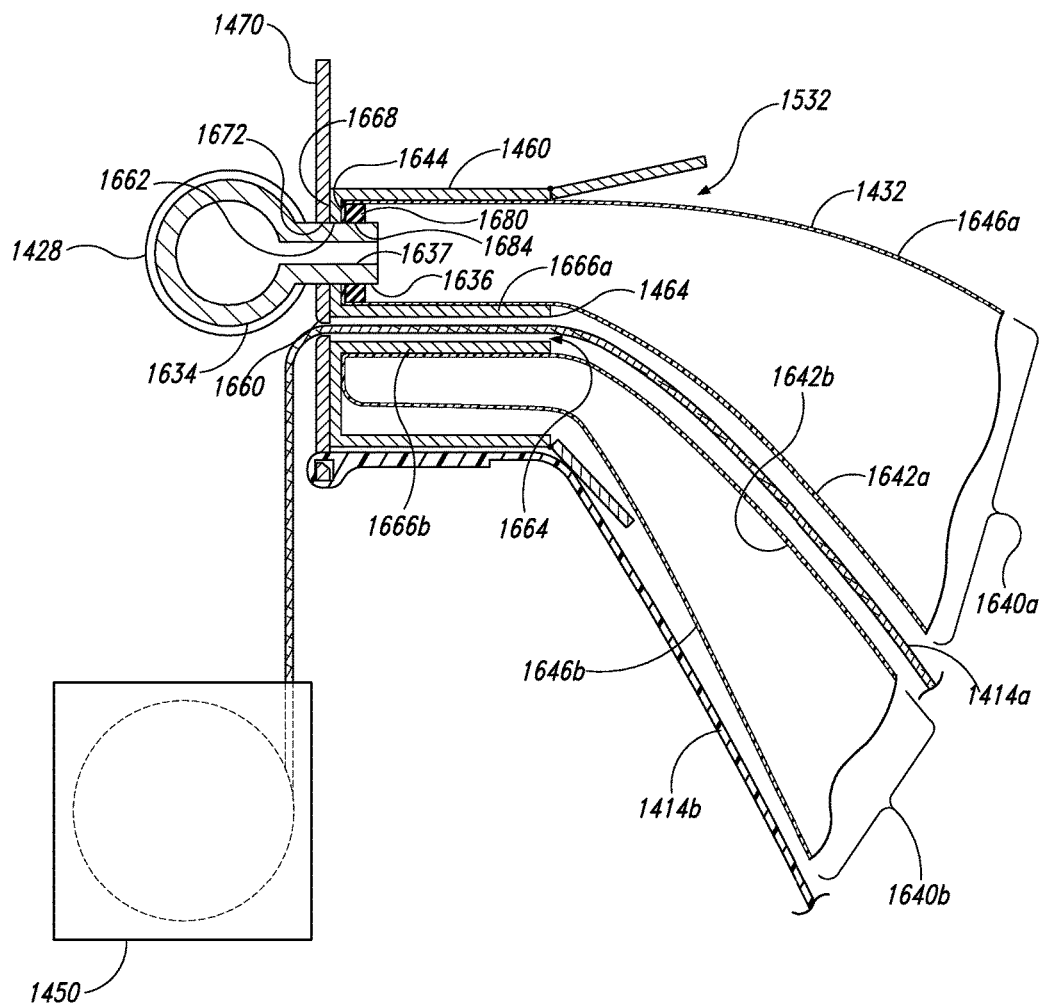
FIG. 16B is a cross-sectional side view taken substantially along line 16B-16B in FIG. 16A.

FIG. 16A is a rear view of an upper portion of the airbag assembly 1430, and FIG. 16B is a side cross-sectional view taken substantially along 16B-16B in FIG. 16A. Referring first to FIG. 16A, in the illustrated embodiment an electronic assembly 1630 (shown schematically) is operably connected to an initiator 1638 via a link 1631 (e.g., one or more wires). The initiator 1638 is operably coupled to an end portion of the inflator 1428, and an opposite end portion of the inflator 1428 is fixedly attached to the mounting bracket 1470 via a fitting 1634. Referring to both FIGS. 16A and 16B, the fitting 1634 includes a nozzle 1636 extending outwardly therefrom through adjacent nozzle apertures 1672 and 1662 in the mounting bracket 1470 and a back wall 1668 of the housing 1460, respectively. The fitting 1634 can be attached to the mounting bracket 1470 via threads, a lock nut, one or more fasteners, and/or other suitable means. The nozzle 1636 includes an outlet 1637 which, upon activation of the initiator 1638, permits pressurized gas (e.g., air) to flow from the inflator 1428 into the airbag 1432, as described in greater detail below.

The electronic assembly 1630 can be at least generally similar in structure and function to the electronic assembly 330 described above with reference to FIG. 3. For example, the electronic assembly 1630 can include one or more processors that receive power from a power source (e.g., one or more batteries), a deployment circuit that activates the initiator 1638, and at least one crash sensor that detects sudden decelerations (e.g., a crash and/or other dynamic events) of the aircraft (or other vehicle in which the restraint system 1410 is used) above a preset or predetermined magnitude. In other embodiments, the electronic assembly 1630 can include other sensors and/or other features to facilitate airbag deployment, and/or some of the components of the electronic assembly 1630 described above may be omitted. In operation, in response to a dynamic event greater than a predetermined threshold (e.g., a deceleration greater than 16 g's), the crash sensor can detect the event and respond by sending a signal to the processor, which causes the processor to send a corresponding signal to the deployment circuit. Upon receiving the signal and confirming that, for example, the lap belt connector 1418 is properly coupled to the buckle 1420 (FIG. 14), the deployment circuit can apply a voltage to the initiator 1638 via the electrical link 1631 to activate the initiator 1638, which in turn causes the inflator 1428 to immediately discharge its compressed gas into the airbag 1432 via the nozzle outlet 1637. The rapid expansion of the compressed gas causes the airbag 1432 to rapidly expand, thereby displacing the housing doors 1462 outwardly and away from the housing 1460 to permit the airbag 1432 to rapidly deploy along the length of the first shoulder belt portion 1414a as described above.

The various airbag deployment and inflation systems described above are provided herein by way of example of suitable systems. It should be noted, however, that various embodiments of the extending airbags described herein are not limited to the particular inflation, mounting, and/or other systems described above, but can be used with other types of systems having other components in other arrangements without departing from the spirit or scope of the present disclosure.

As shown in FIG. 16B, in the illustrated embodiment the airbag 1432 can include a first airbag portion 1640a positioned generally above and/or outwardly from the first shoulder belt portion 1414a, and a second airbag portion 1640b positioned generally beneath and/or inwardly from the first shoulder belt portion 1414a. Additionally, the second airbag portion 1640b is generally positioned between the first shoulder belt portion 1414a and the second shoulder belt portion 1414b. The first airbag portion 1640a can include a first outer layer or panel 1646a and a first inner panel 1642a. Similarly, the second airbag portion 1640b can include a second outer panel 1646b and a second inner panel 1642b. As described in greater detail below, the panels 1642 and 1646 can be formed from respective layers of airbag material. The first inner panel 1642a and the second inner panel 1642b together form a sheath around the first shoulder belt portion 1414a.

To attach the airbag 1432 to the housing 1460, the first airbag portion 1640a includes a portion of material 1644 that is sandwiched between the back wall 1668 of the housing 1460 and an attachment plate 1680. In the illustrated embodiment, the attachment plate 1680 includes an aperture 1684 that permits the nozzle 1636 to extend through the attachment plate 1680, and fastener holes (e.g., threaded fastener holes) on opposite sides thereof that receive fasteners 1682 (e.g., threaded fasteners, such as screws, identified individually as a first fastener 1682a and a second fastener 1682b) for securing the attachment plate 1680 to the mounting bracket 1470. In the foregoing manner, the attachment plate 1680 fixes the upper portion 1532 of the airbag 1432 to the housing 1460 in fluid communication with the inflator 1428.

In another aspect of the illustrated embodiment, the housing 1460 includes a web passage 1664 that extends from the first web aperture 1464 on the front face of the housing 1460 to a second web aperture 1660 that extends through the aft face of the housing 1460 as well as the mounting bracket 1470. The web passage 1664 is defined by a first side wall 1666a and a second side wall 1666b. In operation, the first shoulder belt portion 1414a is able to slide back and forth through the passage 1664 in between the first airbag portion 1640a and the second airbag portion 1640b both when the airbag is stored within the housing 1460 as shown in FIG. 14, and when the airbag 1432 has inflated and fully deployed as shown in FIGS. 15A-16B.

FIGS. 17A and 17B illustrate flat patterns of the outer airbag panel 1646 and the inner airbag panel 1642, respectively, and FIG. 17C is a plan view illustrating an assembly of the outer airbag panel 1646 and the inner airbag panel 1642 to make the airbag 1432 described above. Referring first to FIG. 17A, in the illustrated embodiment, the outer airbag panel 1646 includes a first fold line 1746a that generally divides the outer airbag panel 1646 into the first outer airbag panel 1646a and the second outer airbag panel 1646b. Additionally, the outer airbag panel 1646 includes a first web aperture 1740a sized to permit passage therethrough of the first shoulder belt portion 1414a. The outer airbag panel 1646 can also include a nozzle aperture 1742 to accommodate the inflator nozzle 1636 (FIG. 16B) and adjacent fastener hole 1744a, b for passage of the fasteners 1682a, b (FIG. 16A). Turning next to FIG. 17B, the inner airbag panel 1642 can include a second fold line 1746b generally dividing the inner airbag panel 1642 into the first inner airbag panel 1642a and the second inner airbag panel 1642b. Additionally, the inner airbag panel 1642 can additionally include a second web aperture 1740b proximate the second fold line 1746b to accommodate passage therethrough of the first shoulder belt portion 1414a. In one aspect of the illustrated embodiment, the inner airbag panel 1642 can additionally include a plurality of vent holes 1748 that can enable the airbag 1432 to vent and depressurize after deployment and use.

Referring next to FIG. 17C, to assemble the airbag 1432 in accordance with the illustrated embodiment, the inner airbag panel 1642 can be overlaid on the outer airbag panel 1646, and then both the inner and outer airbag panels can be folded about the respective fold lines 1746. This results in four layers of airbag material (i.e., the first outer panel portion 1646a, the first inner panel portion 1642a, the second inner panel portion 1642b, and the second outer panel portion 1646b) arranged or "stacked" as shown in FIG. 17C. These four layers of airbag material are then joined together by stitching 1750 that extends from the fold lines 1746 to a web opening 1754 proximate the lower end portion of the airbag 1432. Additionally, the airbag outer panel 1646 can be joined to the airbag inner panel 1642 by stitching 1752a that extends around the web apertures 1740, and by stitching 1752b that joins the first outer panel portion 1646a to the first inner panel portion 1642a, and the second outer panel portion 1646b to the second inner panel portion 1642b, around the opening 1754. As those of ordinary skill in the art will understand, construction of the airbag 1432 in the foregoing manner provides the airbag 1432 with the first airbag portion 1640a and the second airbag portion 1640b as described above with reference to, for example, FIG. 16B, and also provides an inner passage defined by the first inner panel portion 1642a and the second inner panel portion 1642b for the first shoulder belt portion 1414a to slide through in use.

FIGS. 18A-18C are a series of front views of the restraint system 1410 illustrating time-sequence inflation of the airbag 1432 in accordance with an embodiment of the present technology. Referring first to FIG. 18A, an occupant 1800 is seated in a vehicle seat 1802 (e.g., a forward-, rearward-, side-, or oblique-facing aircraft seat), and the airbag housing 1460 is fixedly attached to a seat frame or other suitable seat or vehicle structure above the occupant's right shoulder. When the occupant wishes to put on the restraint system 1410, he or she can do so by engaging the web connector 1418 on the first lap belt portion 1412a to the buckle 1420 on the second lap belt portion 1412b. In some embodiments, the shoulder belt 1414 is retracted into the web retractor 1450 (FIG. 14) prior to use, so that the shoulder belt connector 1440 is positioned proximate to the airbag housing 1460. If the occupant 1800 also wishes to put on the shoulder belt 1414 (e.g., for take-off or landing), he or she can do so by reaching up and grasping the shoulder belt connector 1440 and drawing it downwardly across his or her torso to couple the shoulder belt connector 1440 to the post 1444 on the lap belt connector 1418 as described above with reference to FIG. 14. As the occupant 1800 draws the shoulder belt 1414 outwardly from the web retractor 1450, the first shoulder belt portion 1414a passes through the airbag housing 1460 as described above with reference to, for example, FIG. 16B. If the occupant 1800 wishes to remove the shoulder belt 1414 (e.g., after take-off or landing), he or she can do so by disengaging the shoulder belt connector 1440 from the lap belt connector 1418 and letting the first shoulder belt portion 1414a retract back through the airbag housing 1460 and into the web retractor 1450.

If the aircraft experiences a dynamic event (e.g., a rapid deceleration) above a preset magnitude (e.g., above 16 g's) while the occupant 1800 is wearing the shoulder belt 1414 as shown in FIG. 18A, the airbag will inflate and deploy from the housing 1460 as described above. More specifically, with reference to FIG. 18B, as the airbag 1432 rapidly inflates, it expands generally radially and downwardly along the length of the first shoulder belt portion 1414a. As shown in FIG. 18C, when the airbag 1432 is fully inflated, the lower end portion 1534 is positioned proximate or near (e.g., directly adjacent to) the shoulder belt connector 1440 and the lap belt 1412. In this configuration, embodiments of the airbag 1432 can offer protection to the occupant 1800 from head and/or torso impact injury that might otherwise occur during the dynamic event. Moreover, as these figures illustrate, in some embodiments the airbag 1432 can have a generally cylindrical cross-section (e.g., a generally circular cross-section), and can extend along the entire length of the first shoulder belt portion 1414a, or for at least approximately the entire length (e.g., about 75-95% of the entire length) of the first shoulder belt portion 1414a when deployed.

The structure and function of the various airbag systems and/or other associated components described herein can be at least generally similar in structure and function to corresponding systems and components described in U.S. patent application Ser. No. 13/174,659, filed Jun. 30, 2011, and titled INFLATABLE PERSONAL RESTRAINT SYSTEMS; U.S. patent application Ser. No. 09/143,756, filed Aug. 13, 1998, now U.S. Pat. No. 5,984,350, and titled VEHICLE SAFETY SYSTEM; U.S. patent application Ser. No. 10/672,606, filed Sep. 26, 2003, now U.S. Pat. No. 6,957,828, and titled INFLATABLE LAP BELT SAFETY BAG; U.S. patent application Ser. No. 09/253,874, filed Mar. 13, 2000, now U.S. Pat. No. 6,439,600, and titled SELF-CENTERING AIRBAG AND METHOD FOR MANUFACTURING AND TUNING THE SAME; U.S. patent application Ser. No. 09/523,875, filed Mar. 13, 2000, now U.S. Pat. No. 6,535,115, and titled AIR BAG HAVING EXCESSIVE EXTERNAL MAGNETIC FIELD PROTECTION CIRCUITRY; U.S. patent application Ser. No. 09/524,370, filed Mar. 14, 2000, now U.S. Pat. No. 6,217,066, and titled MULTIPLE INFLATOR SAFETY CUSHION; U.S. patent application Ser. No. 12/057,295, filed Mar. 27, 2008, now U.S. Pat. No. 7,665,761, and titled INFLATABLE PERSONAL RESTRAINT SYSTEMS AND ASSOCIATED METHODS OF USE AND MANUFACTURE; U.S.

patent application Ser. No. 12/051,768, filed Mar. 19, 2008, now U.S. Pat. No. 7,980,590, and titled INFLATABLE PERSONAL RESTRAINT SYSTEMS HAVING WEB-MOUNTED INFLATORS AND ASSOCIATED METHODS OF USE AND MANUFACTURE; U.S. patent application Ser. No. 13/608,959, filed Sep. 10, 2012, and titled ELECTRONIC MODULE ASSEMBLY FOR INFLATABLE PERSONAL RESTRAINT SYSTEMS AND ASSOCIATED METHODS; U.S. patent application Ser. No. 13/170,079, filed Jun. 27, 2011, now abandoned, and titled SENSORS FOR DETECTING RAPID DECELERATION/ACCELERATION EVENTS; U.S. patent application Ser. No. 13/194,411, filed Jul. 29, 2011, now U.S. Pat. No. 8,439,398, and titled INFLATOR CONNECTORS FOR INFLATABLE PERSONAL RESTRAINTS AND ASSOCIATED SYSTEMS AND METHODS; U.S. patent application Ser. No. 13/227,392, filed Sep. 7, 2011, now U.S. Pat. No. 8,556,293, and titled BUCKLE CONNECTORS FOR INFLATABLE PERSONAL RESTRAINTS AND ASSOCIATED METHODS OF USE AND MANUFACTURE; U.S. patent application Ser. No. 13/086,134, filed Apr. 13, 2011, now U.S. Pat. No. 8,469,397, and titled STITCH PATTERNS FOR RESTRAINT-MOUNTED AIRBAGS AND ASSOCIATED SYSTEMS AND METHODS; U.S. patent application Ser. No. 13/227,382, filed Sep. 7, 2011, now U.S. Pat. No. 8,403,361, and titled ACTIVATION SYSTEMS FOR INFLATABLE PERSONAL RESTRAINT SYSTEMS; U.S. patent application Ser. No. 13/228,333, filed Sep. 8, 2011, now U.S. Pat. No. 8,818,759, and titled COMPUTER SYSTEM FOR REMOTE TESTING OF INFLATABLE PERSONAL RESTRAINT SYSTEMS; U.S. patent application Ser. No. 13/424,197, filed Mar. 19, 2012, now U.S. Pat. No. 8,523,220, and titled STRUCTURE MOUNTED AIRBAG ASSEMBLIES AND ASSOCIATED SYSTEMS AND METHODS; U.S. Provisional Patent Application No. 62/041,549, filed Aug. 25, 2014, and titled AIRBAG ASSEMBLY FOR LEG FLAIL PROTECTION AND ASSOCIATED SYSTEMS AND METHODS; U.S. patent application Ser. No. 14/505,277, filed Oct. 2, 2014, and titled ACTIVE POSITIONING AIRBAG ASSEMBLY AND ASSOCIATED SYSTEMS AND METHODS; U.S. Provisional Patent Application No. 62/139,684, filed Mar. 28, 2015, and titled EXTENDING PASS-THROUGH AIRBAG OCCUPANT RESTRAINT SYSTEMS, AND ASSOCIATED SYSTEMS AND METHODS; U.S. Provisional Patent Application No. 62/146,268, filed Apr. 11, 2015, and titled ACTIVE AIRBAG VENT SYSTEM; U.S. patent application Ser. No. 15/002,237, filed Jan. 20, 2016, and titled OCCUPANT RESTRAINT SYSTEMS HAVING EXTENDING RESTRAINTS, AND ASSOCIATED SYSTEMS AND METHODS; U.S. Provisional Patent Application No. 62/289,761, filed Feb. 1, 2016, and titled SEAT BELT AIRBAG WITH HEAD PILLOW; and U.S. Provisional Patent Application No. 62/292,642, filed Feb. 8, 2016, and titled MULTI-CHAMBER AIRBAG; and each of the patents and patent applications listed above is incorporated herein by reference in its entirety. Indeed, any patents and applications and other references identified herein, including any that may be listed in accompanying filing papers, are incorporated herein by reference in their entirety. Aspects of the invention can be modified, if necessary, to employ the systems, functions, and concepts of the various references described above to provide yet further implementations of the invention.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples: alternative implementations may employ differing values or ranges.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment. Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. An occupant restraint system comprising:
   an airbag;
   a first web portion extending through the airbag, wherein the first web portion is configured to extend around an occupant to restrain the occupant in a vehicle seat; and
   a second web portion configured to underlay the first web portion, wherein the airbag is operable to inflate and deploy along a length of the first web portion between the first web portion and the second web portion in response to a vehicle dynamic event.

2. The occupant restraint system of claim 1 wherein, when the airbag inflates and deploys in response to the vehicle dynamic event, the airbag includes a first inflated portion positioned to one side of the first web portion and a second inflated portion positioned to an opposite side of the first web portion.

3. The occupant restraint system of claim 1, further comprising a sheath disposed within the airbag, wherein the first web portion extends through the sheath.

4. The occupant restraint system of claim 1 wherein the airbag is operable to inflate and deploy from a stored position to an inflated position, and wherein the first web portion is configured to move back and forth through the airbag when the airbag is in the stored position.

5. The occupant restraint system of claim 1, further comprising a housing, wherein the airbag is stored within the housing prior to inflation of the airbag, and wherein the first web portion is configured to move back and forth through the housing.

6. The vehicle occupant restraint system of claim 1 wherein the first web portion is configured to extend across the torso of the occupant, and wherein the airbag is operable to inflate and deploy along the length of the first web portion from a first location proximate a shoulder of the occupant to a second location proximate the waist of the occupant.

7. The vehicle occupant restraint system of claim 1 wherein the second web portion is configured to underlay the first web portion between the first web portion and the occupant.

8. The vehicle occupant restraint system of claim 1 wherein the first web portion is a shoulder web portion of a 3-point seat belt system.

9. The vehicle occupant restraint system of claim 1 wherein the vehicle seat is an aircraft passenger seat.

10. The occupant restraint system of claim 1, further comprising a web retractor, wherein an end portion of the first web portion or the second web portion is operably coupled to the web retractor.

11. An occupant restraint system, comprising:
    a first web portion;
    a second web portion, wherein the first web portion is configured to overlay the second web portion, and wherein the first and second web portions are configured to extend across a torso of an occupant to restrain the occupant in a vehicle seat;
    an airbag configured to inflate and deploy along a length of the first web portion between the first web portion and the second web portion; and
    a housing having an aperture, wherein the airbag is stored within the housing prior to inflation of the airbag, and wherein the first web portion is configured to move back and forth through the aperture in the housing.

12. The occupant restraint system of claim 11, further comprising a web retractor, wherein an end portion of the first web portion or the second web portion is operably coupled to the web retractor.

13. An occupant restraint system, comprising:
    a vehicle seat;
    a first web portion;
    a second web portion, wherein the first web portion is configured to overlay the second web portion, and wherein the first and second web portions are configured to extend across a torso of an occupant to restrain the occupant in the vehicle seat;
    a web retractor mounted to at least one of the vehicle seat or a vehicle structure adjacent to the vehicle seat, wherein an end portion of the first web portion is operably coupled to the web retractor, and wherein an end portion of the second web portion is fixedly attached relative to the vehicle seat; and
    an airbag configured to inflate and deploy along a length of the first web portion between the first web portion and the second web portion.

14. The occupant restraint system of claim 13 wherein the airbag is configured to inflate and extend from a first location proximate a shoulder of the occupant to a second location proximate a waist of the occupant.

15. An occupant restraint system, comprising:
    a first web portion;
    a second web portion, wherein the first web portion is configured to overlay the second web portion, and wherein the first and second web portions are configured to extend across a torso of an occupant;
    a web connector having a web aperture, wherein the first and second web portions are respective portions of a shoulder belt web that slidably passes through the web aperture;
    a lap belt, wherein the web connector is configured to be releasably coupled to the lap belt to provide a three-point harness for restraining the occupant in a vehicle seat; and
    an airbag configured to inflate and deploy along a length of the first web portion between the first web portion and the second web portion.

16. The occupant restraint system of claim 15, further comprising a web retractor, wherein an end portion of the first web portion or the second web portion is operably coupled to the web retractor.

* * * * *